(12) United States Patent
Yun et al.

(10) Patent No.: US 10,845,491 B2
(45) Date of Patent: Nov. 24, 2020

(54) ENERGY-RESOLVING X-RAY DETECTION SYSTEM

(71) Applicant: Sigray, Inc., Concord, CA (US)

(72) Inventors: Wenbing Yun, Walnut Creek, CA (US); Janos Kirz, Berkeley, CA (US); Benjamin Donald Stripe, Walnut Creek, CA (US)

(73) Assignee: Sigray, Inc., Concord, CA (US)

( * ) Notice: Subject to any disclaimer, the term of this patent is extended or adjusted under 35 U.S.C. 154(b) by 0 days.

(21) Appl. No.: 16/427,178

(22) Filed: May 30, 2019

(65) Prior Publication Data

US 2019/0369272 A1     Dec. 5, 2019

Related U.S. Application Data

(60) Provisional application No. 62/680,795, filed on Jun. 5, 2018, provisional application No. 62/680,451, filed on Jun. 4, 2018.

(51) Int. Cl.
    *G01T 1/36*    (2006.01)

(52) U.S. Cl.
    CPC ..................... *G01T 1/36* (2013.01)

(58) Field of Classification Search
    CPC ........................................................ G01T 1/36
    See application file for complete search history.

(56) References Cited

U.S. PATENT DOCUMENTS

| | | |
|---|---|---|
| 1,203,495 A | 10/1916 | Coolidge |
| 1,211,092 A | 1/1917 | Coolidge |

(Continued)

FOREIGN PATENT DOCUMENTS

| | | |
|---|---|---|
| CN | 101257851 | 9/2008 |
| CN | 101532969 | 9/2009 |

(Continued)

OTHER PUBLICATIONS

"Diamond," Section 10.4.2 of Zorman et al., "Material Aspects of Micro-Nanoelectromechanical Systems," Chapter 10 of Springer Handbook of Nanotechnology, 2nd ed., Barat Bushan, ed. (Springer Science + Business Media, Inc., New York, 2007), pp. 312-314.

(Continued)

*Primary Examiner* — Christine S. Kim
(74) *Attorney, Agent, or Firm* — Knobbe, Martens, Olson & Bear, LLP

(57) ABSTRACT

An energy-resolving x-ray detection system is provided, the system including at least one x-ray optic configured to receive x-rays having an energy bandwidth with a maximum x-ray energy. The at least one x-ray optic has at least one concave surface extending at least partially around and along a longitudinal axis. The at least one concave surface is curved in at least one cross-sectional plane parallel to the longitudinal axis and is configured to direct at least some of the received x-rays into at least one convergent x-ray beam having a minimum beam width in a plane perpendicular to the longitudinal axis. The minimum beam width is at a location and the at least one concave surface has an x-ray reflectivity less than 30% for x-rays having energies greater than one-third of the maximum x-ray energy. The system further includes at least one energy-dispersive x-ray detector configured to receive at least a portion of the at least one convergent x-ray beam. The at least one energy-dispersive x-ray detector has at least one x-ray absorbing element configured to generate detection signals indicative of energies of x-rays absorbed by the at least one x-ray absorbing element. The at least one x-ray absorbing element is within a range of zero to 40 mm from the location of the minimum beam width.

21 Claims, 5 Drawing Sheets

(56) References Cited

U.S. PATENT DOCUMENTS

| | | | |
|---|---|---|---|
| 1,215,116 A | 2/1917 | Coolidge | |
| 1,328,495 A | 1/1920 | Coolidge | |
| 1,355,126 A | 10/1920 | Coolidge | |
| 1,790,073 A | 1/1931 | Pohl | |
| 1,917,099 A | 7/1933 | Coolidge | |
| 1,946,312 A | 2/1934 | Coolidge | |
| 2,926,270 A | 2/1960 | Zunick | |
| 3,795,832 A | 3/1974 | Holland | |
| 4,165,472 A | 8/1979 | Wittry | |
| 4,192,994 A * | 3/1980 | Kastner | G02B 5/1838 356/334 |
| 4,227,112 A | 10/1980 | Waugh et al. | |
| 4,266,138 A | 5/1981 | Nelson et al. | |
| 4,426,718 A | 1/1984 | Hayashi | |
| 4,523,327 A | 6/1985 | Eversole | |
| 4,573,186 A | 2/1986 | Reinhold | |
| 4,727,000 A | 2/1988 | Ovshinsky | |
| 4,798,446 A * | 1/1989 | Hettrick | G02B 5/1838 359/570 |
| 4,807,268 A | 2/1989 | Wittrey | |
| 4,940,319 A | 7/1990 | Ueda et al. | |
| 4,945,552 A | 7/1990 | Ueda | |
| 4,951,304 A | 8/1990 | Piestrup et al. | |
| 4,972,449 A | 11/1990 | Upadhya et al. | |
| 5,001,737 A | 3/1991 | Lewis et al. | |
| 5,008,918 A | 4/1991 | Lee et al. | |
| 5,119,408 A | 6/1992 | Little | |
| 5,132,997 A | 7/1992 | Kojima | |
| 5,148,462 A | 9/1992 | Spitsyn et al. | |
| 5,173,928 A | 12/1992 | Momose et al. | |
| 5,204,887 A * | 4/1993 | Hayashida | B82Y 10/00 378/145 |
| 5,249,216 A | 9/1993 | Ohsugi et al. | |
| 5,276,724 A | 1/1994 | Kumasaka et al. | |
| 5,371,774 A * | 12/1994 | Cerrina | G03F 7/70075 378/145 |
| 5,452,142 A * | 9/1995 | Hall | G02B 5/10 359/876 |
| 5,461,657 A * | 10/1995 | Hayashida | G03F 7/70058 378/145 |
| 5,513,237 A | 4/1996 | Nobuta et al. | |
| 5,602,899 A | 2/1997 | Larson | |
| 5,604,782 A * | 2/1997 | Cash, Jr. | G21K 1/06 250/353 |
| 5,629,969 A | 5/1997 | Koshishiba | |
| 5,657,365 A | 8/1997 | Yamamoto et al. | |
| 5,682,415 A | 10/1997 | O'Hara | |
| 5,715,291 A | 2/1998 | Momose | |
| 5,729,583 A | 3/1998 | Tang et al. | |
| 5,737,387 A | 4/1998 | Smither | |
| 5,768,339 A | 6/1998 | O'Hara | |
| 5,772,903 A | 6/1998 | Hirsch | |
| 5,778,039 A | 7/1998 | Hossain | |
| 5,799,056 A | 8/1998 | Gulman | |
| 5,812,629 A | 9/1998 | Clauser | |
| 5,825,848 A | 10/1998 | Virshup et al. | |
| 5,832,052 A | 11/1998 | Hirose et al. | |
| 5,857,008 A | 1/1999 | Reinhold | |
| 5,878,110 A | 3/1999 | Yamamoto et al. | |
| 5,881,126 A | 3/1999 | Momose | |
| 5,912,940 A | 6/1999 | O'hara | |
| 5,930,325 A | 7/1999 | Momose | |
| 6,108,397 A | 8/2000 | Cash, Jr. | |
| 6,108,398 A | 8/2000 | Mazor et al. | |
| 6,118,853 A | 9/2000 | Hansen et al. | |
| 6,125,167 A | 9/2000 | Morgan | |
| 6,195,410 B1 | 2/2001 | Cash, Jr. | |
| 6,226,347 B1 | 5/2001 | Golenhofen | |
| 6,278,764 B1 | 8/2001 | Barbee, Jr. et al. | |
| 6,307,916 B1 | 10/2001 | Rogers et al. | |
| 6,359,964 B1 | 3/2002 | Kogan | |
| 6,377,660 B1 | 4/2002 | Ukita et al. | |
| 6,381,303 B1 | 4/2002 | Vu et al. | |
| 6,389,100 B1 | 5/2002 | Verman et al. | |
| 6,430,254 B2 | 8/2002 | Wilkins | |
| 6,430,260 B1 | 8/2002 | Snyder | |
| 6,442,231 B1 | 8/2002 | O'Hara | |
| 6,456,688 B1 | 9/2002 | Taguchi et al. | |
| 6,463,123 B1 | 10/2002 | Korenev | |
| 6,487,272 B1 | 11/2002 | Kutsuzawa | |
| 6,504,901 B1 | 1/2003 | Loxley et al. | |
| 6,504,902 B2 | 1/2003 | Iwasaki et al. | |
| 6,507,388 B2 | 1/2003 | Burghoorn | |
| 6,553,096 B1 | 4/2003 | Zhou et al. | |
| 6,560,313 B1 | 5/2003 | Harding et al. | |
| 6,560,315 B1 | 5/2003 | Price et al. | |
| 6,707,883 B1 | 3/2004 | Tiearney et al. | |
| 6,711,234 B1 | 3/2004 | Loxley et al. | |
| 6,763,086 B2 | 7/2004 | Platonov | |
| 6,811,612 B2 | 11/2004 | Gruen et al. | |
| 6,815,363 B2 | 11/2004 | Yun et al. | |
| 6,829,327 B1 | 12/2004 | Chen | |
| 6,847,699 B2 | 1/2005 | Rigali et al. | |
| 6,850,598 B1 | 2/2005 | Fryda et al. | |
| 6,870,172 B1 | 3/2005 | Mankos et al. | |
| 6,885,503 B2 | 4/2005 | Yun et al. | |
| 6,891,627 B1 | 5/2005 | Levy et al. | |
| 6,914,723 B2 | 7/2005 | Yun et al. | |
| 6,917,472 B1 | 7/2005 | Yun et al. | |
| 6,934,359 B2 | 8/2005 | Chen | |
| 6,947,522 B2 | 9/2005 | Wilson et al. | |
| 6,975,703 B2 | 12/2005 | Wilson et al. | |
| 7,003,077 B2 | 2/2006 | Jen et al. | |
| 7,006,596 B1 | 2/2006 | Janik | |
| 7,015,467 B2 | 3/2006 | Maldonado et al. | |
| 7,023,950 B1 | 4/2006 | Annis | |
| 7,023,955 B2 | 4/2006 | Chen et al. | |
| 7,057,187 B1 | 6/2006 | Yun et al. | |
| 7,076,026 B2 | 6/2006 | Verman et al. | |
| 7,079,625 B2 | 7/2006 | Lenz | |
| 7,095,822 B1 | 8/2006 | Yun | |
| 7,103,138 B2 | 9/2006 | Pelc et al. | |
| 7,110,503 B1 | 9/2006 | Kumakhov | |
| 7,119,953 B2 | 10/2006 | Yun et al. | |
| 7,120,228 B2 | 10/2006 | Yokhin et al. | |
| 7,130,375 B1 | 10/2006 | Yun et al. | |
| 7,170,969 B1 | 1/2007 | Yun et al. | |
| 7,180,979 B2 | 2/2007 | Momose | |
| 7,180,981 B2 | 2/2007 | Wang | |
| 7,183,547 B2 | 2/2007 | Yun et al. | |
| 7,215,736 B1 | 5/2007 | Wang et al. | |
| 7,215,741 B2 | 5/2007 | Ukita et al. | |
| 7,218,700 B2 | 5/2007 | Huber et al. | |
| 7,218,703 B2 | 5/2007 | Yada et al. | |
| 7,221,731 B2 | 5/2007 | Yada et al. | |
| 7,245,696 B2 | 7/2007 | Yun et al. | |
| 7,264,397 B2 | 9/2007 | Ritter | |
| 7,268,945 B2 | 9/2007 | Yun et al. | |
| 7,286,640 B2 | 10/2007 | Yun et al. | |
| 7,297,959 B2 | 11/2007 | Yun et al. | |
| 7,298,826 B2 | 11/2007 | Inazuru | |
| 7,330,533 B2 | 2/2008 | Sampayon | |
| 7,346,148 B2 | 3/2008 | Ukita | |
| 7,346,204 B2 | 3/2008 | Ito | |
| 7,349,525 B2 | 3/2008 | Morton | |
| 7,359,487 B1 | 4/2008 | Newcome | |
| 7,365,909 B2 | 4/2008 | Yun et al. | |
| 7,365,918 B1 | 4/2008 | Yun et al. | |
| 7,382,864 B2 | 6/2008 | Hebert et al. | |
| 7,388,942 B2 | 6/2008 | Wang et al. | |
| 7,394,890 B1 | 7/2008 | Wang et al. | |
| 7,400,704 B1 | 7/2008 | Yun et al. | |
| 7,406,151 B1 | 7/2008 | Yun | |
| 7,412,024 B1 | 8/2008 | Yun et al. | |
| 7,412,030 B1 * | 8/2008 | O'Hara | G21K 1/06 378/145 |
| 7,412,131 B2 | 8/2008 | Lee et al. | |
| 7,414,787 B2 | 8/2008 | Yun et al. | |
| 7,433,444 B2 | 10/2008 | Baumann | |
| 7,440,542 B2 | 10/2008 | Baumann | |
| 7,443,953 B1 | 10/2008 | Yun et al. | |
| 7,443,958 B2 | 10/2008 | Harding | |
| 7,453,981 B2 | 11/2008 | Baumann | |

(56) References Cited

U.S. PATENT DOCUMENTS

| | | |
|---|---|---|
| 7,463,712 B2 | 12/2008 | Zhu et al. |
| 7,486,770 B2 | 2/2009 | Baumann |
| 7,492,871 B2 | 2/2009 | Popescu |
| 7,499,521 B2 | 3/2009 | Wang et al. |
| 7,515,684 B2 | 4/2009 | Gibson et al. |
| 7,522,698 B2 | 4/2009 | Popescu |
| 7,522,707 B2 | 4/2009 | Steinlage et al. |
| 7,522,708 B2 | 4/2009 | Heismann |
| 7,529,343 B2 | 5/2009 | Safai et al. |
| 7,532,704 B2 | 5/2009 | Hempel |
| 7,551,719 B2 | 6/2009 | Yokhin et al. |
| 7,551,722 B2 | 6/2009 | Ohshima et al. |
| 7,561,662 B2 | 7/2009 | Wang et al. |
| 7,564,941 B2 | 7/2009 | Baumann |
| 7,583,789 B1 | 9/2009 | Macdonald et al. |
| 7,601,399 B2 | 10/2009 | Barnola et al. |
| 7,605,371 B2 | 10/2009 | Yasui et al. |
| 7,639,786 B2 | 12/2009 | Baumann |
| 7,646,843 B2 | 1/2010 | Popescu et al. |
| 7,672,433 B2 | 3/2010 | Zhong et al. |
| 7,680,243 B2 | 3/2010 | Yokhin et al. |
| 7,738,629 B2 | 6/2010 | Chen |
| 7,787,588 B1 | 8/2010 | Yun et al. |
| 7,796,725 B1 | 9/2010 | Yun et al. |
| 7,796,726 B1 | 9/2010 | Gendreau et al. |
| 7,800,072 B2 | 9/2010 | Yun et al. |
| 7,809,113 B2 | 10/2010 | Aoki et al. |
| 7,813,475 B1 | 10/2010 | Wu et al. |
| 7,817,777 B2 | 10/2010 | Baumann et al. |
| 7,848,483 B2 | 12/2010 | Platonov |
| 7,864,426 B2 | 1/2011 | Yun et al. |
| 7,864,922 B2 | 1/2011 | Kawabe |
| 7,873,146 B2 | 1/2011 | Okunuki et al. |
| 7,876,883 B2 | 1/2011 | O'Hara |
| 7,889,838 B2 | 2/2011 | David et al. |
| 7,889,844 B2 | 2/2011 | Okunuki et al. |
| 7,899,154 B2 | 3/2011 | Chen et al. |
| 7,902,528 B2 | 3/2011 | Hara et al. |
| 7,914,693 B2 | 3/2011 | Jeong et al. |
| 7,920,673 B2 | 4/2011 | Lanza et al. |
| 7,920,676 B2 | 4/2011 | Yun et al. |
| 7,924,973 B2 | 4/2011 | Kottler et al. |
| 7,929,667 B1 | 4/2011 | Zhuang et al. |
| 7,945,018 B2 | 5/2011 | Heismann |
| 7,949,092 B2 | 5/2011 | Brons |
| 7,949,095 B2 | 5/2011 | Ning |
| 7,974,379 B1 | 7/2011 | Case et al. |
| 7,983,381 B2 | 7/2011 | David et al. |
| 7,991,120 B2 | 8/2011 | Okunuki et al. |
| 8,005,185 B2 | 8/2011 | Popescu |
| 8,009,796 B2 | 8/2011 | Popescu |
| 8,009,797 B2 | 8/2011 | Ouchi |
| 8,041,004 B2 | 10/2011 | David |
| 8,036,341 B2 | 11/2011 | Lee |
| 8,058,621 B2 | 11/2011 | Kommareddy |
| 8,068,579 B1 | 11/2011 | Yun et al. |
| 8,073,099 B2 | 12/2011 | Niu et al. |
| 8,094,784 B2 | 1/2012 | Morton |
| 8,139,711 B2 | 3/2012 | Takahashi |
| 8,139,716 B2 | 3/2012 | Okunuki et al. |
| 8,184,771 B2 | 5/2012 | Murakoshi |
| 8,208,602 B2 | 6/2012 | Lee |
| 8,208,603 B2 | 6/2012 | Sato |
| 8,233,587 B2 | 7/2012 | Sato |
| 8,243,879 B2 | 8/2012 | Itoh et al. |
| 8,243,884 B2 | 8/2012 | Rödhammer et al. |
| 8,249,220 B2 | 8/2012 | Verman et al. |
| 8,280,000 B2 | 10/2012 | Takahashi |
| 8,306,183 B2 | 11/2012 | Koehler |
| 8,306,184 B2 | 11/2012 | Chang et al. |
| 8,331,534 B2 | 12/2012 | Silver |
| 8,351,569 B2 | 1/2013 | Baker |
| 8,351,570 B2 | 1/2013 | Nakamura |
| 8,353,628 B1 | 1/2013 | Yun et al. |
| 8,357,894 B2 | 1/2013 | Toth et al. |
| 8,360,640 B2 | 1/2013 | Reinhold |
| 8,374,309 B2 | 2/2013 | Donath |
| 8,406,378 B2 | 3/2013 | Wang et al. |
| 8,416,920 B2 | 4/2013 | Okumura et al. |
| 8,422,633 B2 | 4/2013 | Lantz et al. |
| 8,423,127 B2 | 4/2013 | Mahmood et al. |
| 8,451,975 B2 | 5/2013 | Tada |
| 8,422,637 B2 | 6/2013 | Okunuki et al. |
| 8,488,743 B2 | 7/2013 | Verman |
| 8,509,386 B2 | 8/2013 | Lee et al. |
| 8,520,803 B2 | 8/2013 | Behling |
| 8,526,575 B1 | 9/2013 | Yun et al. |
| 8,532,257 B2 | 9/2013 | Mukaide et al. |
| 8,553,843 B2 | 10/2013 | Drory |
| 8,559,594 B2 | 10/2013 | Ouchi |
| 8,559,597 B2 | 10/2013 | Chen et al. |
| 8,565,371 B2 | 10/2013 | Bredno |
| 8,576,983 B2 | 11/2013 | Baeumer |
| 8,588,372 B2 | 11/2013 | Zou et al. |
| 8,591,108 B2 | 11/2013 | Tada |
| 8,602,648 B1 | 12/2013 | Jacobsen et al. |
| 8,632,247 B2 | 1/2014 | Ishii |
| 8,644,451 B2 | 2/2014 | Aoki et al. |
| 8,666,024 B2 | 3/2014 | Okunuki et al. |
| 8,666,025 B2 | 3/2014 | Klausz |
| 8,699,667 B2 | 4/2014 | Steinlage et al. |
| 8,735,844 B1 | 5/2014 | Khaykovich et al. |
| 8,737,565 B1 | 5/2014 | Lyon et al. |
| 8,744,048 B2 | 6/2014 | Lee et al. |
| 8,755,487 B2 | 6/2014 | Kaneko |
| 8,767,915 B2 | 7/2014 | Stutman |
| 8,767,916 B2 | 7/2014 | Hashimoto |
| 8,781,069 B2 | 7/2014 | Murakoshi |
| 8,824,629 B2 | 9/2014 | Ishii |
| 8,831,174 B2 | 9/2014 | Kohara |
| 8,831,175 B2 | 9/2014 | Silver et al. |
| 8,831,179 B2 | 9/2014 | Adler et al. |
| 8,837,680 B2 | 9/2014 | Tsujii |
| 8,855,265 B2 | 10/2014 | Engel |
| 8,859,977 B2 | 10/2014 | Kondoh |
| 8,861,682 B2 | 10/2014 | Okunuki et al. |
| 8,903,042 B2 | 12/2014 | Ishii |
| 8,908,824 B2 | 12/2014 | Kondoh |
| 8,972,191 B2 | 3/2015 | Stampanoni et al. |
| 8,989,351 B2 | 3/2015 | Vogtmeier et al. |
| 8,989,474 B2 | 3/2015 | Kido et al. |
| 8,995,622 B2 | 3/2015 | Adler et al. |
| 9,001,967 B2 | 4/2015 | Baturin |
| 9,001,968 B2 | 4/2015 | Kugland et al. |
| 9,007,562 B2 | 4/2015 | Marconi et al. |
| 9,008,278 B2 | 4/2015 | Lee et al. |
| 9,016,943 B2 | 4/2015 | Jacobsen et al. |
| 9,020,101 B2 | 4/2015 | Omote et al. |
| 9,025,725 B2 | 5/2015 | Kiyohara et al. |
| 9,029,795 B2 | 5/2015 | Sando |
| 9,031,201 B2 | 5/2015 | Sato |
| 9,063,055 B2 | 6/2015 | Ouchi |
| 9,086,536 B2 | 7/2015 | Pang et al. |
| 9,129,715 B2 | 9/2015 | Adler et al. |
| 9,222,899 B2 | 12/2015 | Yamaguchi |
| 9,234,856 B2 | 1/2016 | Mukaide |
| 9,251,995 B2 | 2/2016 | Ogura |
| 9,257,254 B2 | 2/2016 | Ogura et al. |
| 9,263,225 B2 | 2/2016 | Morton |
| 9,280,056 B2 | 3/2016 | Clube et al. |
| 9,281,158 B2 | 3/2016 | Ogura |
| 9,291,578 B2 | 3/2016 | Adler |
| 9,329,141 B2 | 5/2016 | Stutman |
| 9,336,917 B2 | 5/2016 | Ozawa et al. |
| 9,357,975 B2 | 6/2016 | Baturin |
| 9,362,081 B2 | 6/2016 | Bleuet |
| 9,370,084 B2 | 6/2016 | Sprong et al. |
| 9,390,881 B2 | 7/2016 | Yun et al. |
| 9,412,552 B2 | 8/2016 | Aoki et al. |
| 9,430,832 B2 | 8/2016 | Koehler et al. |
| 9,439,613 B2 | 9/2016 | Stutman |
| 9,445,775 B2 | 9/2016 | Das |
| 9,448,190 B2 | 9/2016 | Yun et al. |
| 9,449,780 B2 | 9/2016 | Chen |

(56) References Cited

U.S. PATENT DOCUMENTS

| | | |
|---|---|---|
| 9,449,781 B2 | 9/2016 | Yun et al. |
| 9,453,803 B2 | 9/2016 | Radicke |
| 9,486,175 B2 | 11/2016 | Fredenberg et al. |
| 9,494,534 B2 | 11/2016 | Baturin |
| 9,502,204 B2 | 11/2016 | Ikarashi |
| 9,520,260 B2 | 12/2016 | Hesselink et al. |
| 9,524,846 B2 | 12/2016 | Sato et al. |
| 9,532,760 B2 | 1/2017 | Anton et al. |
| 9,543,109 B2 | 1/2017 | Yun et al. |
| 9,564,284 B2 | 2/2017 | Gerzoskovitz |
| 9,570,264 B2 | 2/2017 | Ogura et al. |
| 9,570,265 B1 | 2/2017 | Yun et al. |
| 9,588,066 B2 | 3/2017 | Pois et al. |
| 9,594,036 B2 | 3/2017 | Yun et al. |
| 9,595,415 B2 | 3/2017 | Ogura |
| 9,632,040 B2 | 4/2017 | Stutman |
| 9,658,174 B2 | 5/2017 | Omote |
| 9,700,267 B2 | 7/2017 | Baturin et al. |
| 9,719,947 B2 | 8/2017 | Yun et al. |
| 9,748,012 B2 | 8/2017 | Yokoyama |
| 9,757,081 B2 | 9/2017 | Proksa |
| 9,761,021 B2 | 9/2017 | Koehler |
| 9,823,203 B2 | 11/2017 | Yun et al. |
| 9,826,949 B2 | 11/2017 | Ning |
| 9,837,178 B2 | 12/2017 | Nagai |
| 9,842,414 B2 | 12/2017 | Koehler |
| 9,861,330 B2 | 1/2018 | Rossl |
| 9,874,531 B2 | 1/2018 | Yun et al. |
| 9,881,710 B2 | 1/2018 | Roessl |
| 9,916,655 B2 | 3/2018 | Sampanoni |
| 9,934,930 B2 | 4/2018 | Parker et al. |
| 9,939,392 B2 | 4/2018 | Wen |
| 9,970,119 B2 | 5/2018 | Yokoyama |
| 10,014,148 B2 | 7/2018 | Tang et al. |
| 10,020,158 B2 | 7/2018 | Yamada |
| 10,028,716 B2 | 7/2018 | Rossl |
| 10,045,753 B2 | 8/2018 | Teshima |
| 10,068,740 B2 | 9/2018 | Gupta |
| 10,074,451 B2 | 9/2018 | Kottler et al. |
| 10,076,297 B2 | 9/2018 | Bauer |
| 10,085,701 B2 | 10/2018 | Hoshino |
| 10,105,112 B2 | 10/2018 | Utsumi |
| 10,115,557 B2 | 10/2018 | Ishii |
| 10,141,081 B2 | 11/2018 | Preusche |
| 10,151,713 B2 | 12/2018 | Wu et al. |
| 10,153,061 B2 | 12/2018 | Yokoyama |
| 10,153,062 B2 | 12/2018 | Gall et al. |
| 10,176,297 B2 | 1/2019 | Zerhusen et al. |
| 10,182,194 B2 | 1/2019 | Karim et al. |
| 10,217,596 B2 | 2/2019 | Liang et al. |
| 10,231,687 B2 | 3/2019 | Kahn et al. |
| 10,247,683 B2 | 4/2019 | Yun et al. |
| 10,256,001 B2 | 4/2019 | Yokoyama |
| 10,264,659 B1 | 4/2019 | Miller et al. |
| 10,267,752 B2 | 4/2019 | Zhang et al. |
| 10,267,753 B2 | 4/2019 | Zhang et al. |
| 10,269,528 B2 | 4/2019 | Yun et al. |
| 10,295,485 B2 | 5/2019 | Yun et al. |
| 10,295,486 B2 | 5/2019 | Yun et al. |
| 10,297,359 B2 | 5/2019 | Yun et al. |
| 10,304,580 B2 | 5/2019 | Yun et al. |
| 10,349,908 B2 | 7/2019 | Yun et al. |
| 10,352,695 B2 | 7/2019 | Dziura et al. |
| 10,352,880 B2 | 7/2019 | Yun et al. |
| 10,393,683 B2 | 8/2019 | Hegeman et al. |
| 10,401,309 B2 | 9/2019 | Yun et al. |
| 10,416,099 B2 | 9/2019 | Yun et al. |
| 10,429,325 B2 | 10/2019 | Ito et al. |
| 2001/0006413 A1 | 7/2001 | Burghoorn |
| 2002/0080916 A1 | 6/2002 | Jiang |
| 2002/0085676 A1 | 7/2002 | Snyder |
| 2003/0142790 A1 | 1/2003 | Zhou et al. |
| 2003/0054133 A1 | 3/2003 | Wadley et al. |
| 2003/0112923 A1 | 6/2003 | Lange |
| 2003/0223536 A1 | 12/2003 | Yun et al. |
| 2004/0047446 A1 | 3/2004 | Platonov |
| 2004/0120463 A1 | 6/2004 | Wilson et al. |
| 2004/0140432 A1 | 7/2004 | Maldonado et al. |
| 2005/0025281 A1 | 2/2005 | Verman et al. |
| 2005/0074094 A1 | 4/2005 | Jen et al. |
| 2005/0123097 A1 | 6/2005 | Wang |
| 2005/0163284 A1 | 7/2005 | Inazuru |
| 2005/0282300 A1 | 12/2005 | Yun et al. |
| 2006/0045234 A1 | 3/2006 | Pelc |
| 2006/0062350 A1 | 3/2006 | Yokhin |
| 2006/0233309 A1 | 10/2006 | Kutzner et al. |
| 2006/0239405 A1 | 10/2006 | Verman |
| 2007/0030959 A1 | 2/2007 | Ritter |
| 2007/0071174 A1 | 3/2007 | Hebert et al. |
| 2007/0108387 A1 | 5/2007 | Yun et al. |
| 2007/0110217 A1 | 5/2007 | Ukita |
| 2007/0183563 A1 | 8/2007 | Baumann |
| 2007/0183579 A1 | 8/2007 | Baumann et al. |
| 2007/0189449 A1 | 8/2007 | Baumann |
| 2007/0248215 A1 | 10/2007 | Ohshima et al. |
| 2008/0084966 A1 | 4/2008 | Aoki et al. |
| 2008/0089484 A1 | 4/2008 | Reinhold |
| 2008/0094694 A1 | 4/2008 | Yun et al. |
| 2008/0099935 A1* | 5/2008 | Egle .............. G03F 7/70166 264/1.7 |
| 2008/0116398 A1 | 5/2008 | Hara |
| 2008/0117511 A1 | 5/2008 | Chen |
| 2008/0159707 A1 | 7/2008 | Lee et al. |
| 2008/0165355 A1 | 7/2008 | Yasui et al. |
| 2008/0170662 A1 | 7/2008 | Reinhold |
| 2008/0170668 A1 | 7/2008 | Kruit et al. |
| 2008/0181363 A1 | 7/2008 | Fenter et al. |
| 2008/0240344 A1 | 10/2008 | Reinhold |
| 2008/0273662 A1 | 11/2008 | Yun |
| 2009/0052619 A1 | 2/2009 | Endoh |
| 2009/0092227 A1 | 4/2009 | David |
| 2009/0154640 A1 | 6/2009 | Baumann et al. |
| 2009/0316860 A1 | 12/2009 | Okunuki et al. |
| 2010/0012845 A1 | 1/2010 | Baeumer et al. |
| 2010/0027739 A1 | 2/2010 | Lantz et al. |
| 2010/0040202 A1 | 2/2010 | Lee |
| 2010/0046702 A1 | 2/2010 | Chen et al. |
| 2010/0061508 A1 | 3/2010 | Takahashi |
| 2010/0091947 A1 | 4/2010 | Niu |
| 2010/0141151 A1 | 6/2010 | Reinhold |
| 2010/0246765 A1 | 9/2010 | Murakoshi |
| 2010/0260315 A1 | 10/2010 | Sato et al. |
| 2010/0272239 A1 | 10/2010 | Lantz et al. |
| 2010/0284513 A1 | 11/2010 | Kawabe |
| 2011/0026680 A1 | 2/2011 | Sato |
| 2011/0038455 A1 | 2/2011 | Silver et al. |
| 2011/0058655 A1 | 3/2011 | Okumura et al. |
| 2011/0064191 A1 | 3/2011 | Toth et al. |
| 2011/0085644 A1 | 4/2011 | Verman |
| 2011/0135066 A1 | 6/2011 | Behling |
| 2011/0142204 A1 | 6/2011 | Zou et al. |
| 2011/0235781 A1 | 9/2011 | Aoki et al. |
| 2011/0243302 A1 | 10/2011 | Murakoshi |
| 2011/0268252 A1 | 11/2011 | Ozawa et al. |
| 2012/0041679 A1 | 2/2012 | Stampanoni |
| 2012/0057669 A1 | 3/2012 | Vogtmeier et al. |
| 2012/0163547 A1 | 6/2012 | Lee et al. |
| 2012/0163554 A1 | 6/2012 | Tada |
| 2012/0224670 A1 | 9/2012 | Kiyohara et al. |
| 2012/0228475 A1 | 9/2012 | Pang et al. |
| 2012/0269323 A1 | 10/2012 | Adler et al. |
| 2012/0269324 A1 | 10/2012 | Adler |
| 2012/0269325 A1 | 10/2012 | Adler et al. |
| 2012/0269326 A1 | 10/2012 | Adler et al. |
| 2012/0294420 A1 | 11/2012 | Nagai |
| 2013/0011040 A1 | 1/2013 | Kido et al. |
| 2013/0032727 A1 | 2/2013 | Kondoe |
| 2013/0039460 A1 | 2/2013 | Levy |
| 2013/0108012 A1 | 5/2013 | Sato |
| 2013/0108022 A1 | 5/2013 | Kugland et al. |
| 2013/0195246 A1 | 8/2013 | Tamura et al. |
| 2013/0223594 A1 | 8/2013 | Sprong et al. |
| 2013/0235976 A1 | 9/2013 | Jeong et al. |
| 2013/0259207 A1 | 10/2013 | Omote et al. |

(56) References Cited

U.S. PATENT DOCUMENTS

| | | |
|---|---|---|
| 2013/0279651 A1 | 10/2013 | Yokoyama |
| 2013/0308112 A1 | 11/2013 | Clube et al. |
| 2013/0308754 A1 | 11/2013 | Yamazaki et al. |
| 2014/0023973 A1 | 1/2014 | Marconi et al. |
| 2014/0037052 A1 | 2/2014 | Adler |
| 2014/0064445 A1 | 3/2014 | Adler |
| 2014/0072104 A1 | 3/2014 | Jacobsen et al. |
| 2014/0079188 A1 | 3/2014 | Hesselink et al. |
| 2014/0105363 A1 | 4/2014 | Chen et al. |
| 2014/0146945 A1 | 5/2014 | Fredenberg et al. |
| 2014/0153692 A1 | 6/2014 | Larkin et al. |
| 2014/0177800 A1 | 6/2014 | Sato et al. |
| 2014/0185778 A1 | 7/2014 | Lee et al. |
| 2014/0205057 A1 | 7/2014 | Koehler et al. |
| 2014/0211919 A1 | 7/2014 | Ogura et al. |
| 2014/0226785 A1 | 8/2014 | Stutman et al. |
| 2014/0241493 A1 | 8/2014 | Yokoyama |
| 2014/0270060 A1 | 9/2014 | Date et al. |
| 2014/0369469 A1 | 12/2014 | Ogura et al. |
| 2015/0030126 A1 | 1/2015 | Radicke |
| 2015/0030127 A1 | 1/2015 | Aoki et al. |
| 2015/0043713 A1 | 2/2015 | Chen |
| 2015/0049860 A1 | 2/2015 | Das |
| 2015/0055743 A1 | 2/2015 | Vedantham et al. |
| 2015/0055745 A1 | 2/2015 | Holzner et al. |
| 2015/0071402 A1 | 3/2015 | Handa |
| 2015/0092924 A1 | 4/2015 | Yun et al. |
| 2015/0110252 A1 | 4/2015 | Yun et al. |
| 2015/0117599 A1 | 4/2015 | Yun et al. |
| 2015/0194287 A1 | 7/2015 | Yun et al. |
| 2015/0243397 A1 | 8/2015 | Yun et al. |
| 2015/0247811 A1 | 9/2015 | Yun et al. |
| 2015/0260663 A1 | 9/2015 | Yun et al. |
| 2015/0323478 A1 | 11/2015 | Stutman |
| 2015/0357069 A1 | 12/2015 | Yun et al. |
| 2016/0064175 A1 | 3/2016 | Yun et al. |
| 2016/0066870 A1 | 3/2016 | Yun et al. |
| 2016/0106387 A1 | 4/2016 | Kahn |
| 2016/0178540 A1 | 6/2016 | Yun et al. |
| 2016/0178541 A1 | 6/2016 | Hwang et al. |
| 2016/0268094 A1 | 9/2016 | Yun et al. |
| 2016/0320320 A1 | 11/2016 | Yun et al. |
| 2016/0351370 A1 | 12/2016 | Yun et al. |
| 2017/0018392 A1 | 1/2017 | Cheng |
| 2017/0047191 A1 | 2/2017 | Yun et al. |
| 2017/0052128 A1 | 2/2017 | Yun et al. |
| 2017/0074809 A1 | 3/2017 | Ito |
| 2017/0162288 A1 | 6/2017 | Yun et al. |
| 2017/0162359 A1 | 6/2017 | Tang et al. |
| 2017/0227476 A1 | 8/2017 | Zhang et al. |
| 2017/0234811 A1 | 8/2017 | Zhang et al. |
| 2017/0261442 A1 | 9/2017 | Yun et al. |
| 2017/0336334 A1 | 11/2017 | Yun et al. |
| 2018/0144901 A1 | 5/2018 | Yun et al. |
| 2018/0202951 A1 | 7/2018 | Yun et al. |
| 2018/0261352 A1 | 9/2018 | Matsuyama et al. |
| 2018/0306734 A1 | 10/2018 | Morimoto et al. |
| 2018/0323032 A1 | 11/2018 | Strelec et al. |
| 2018/0344276 A1 | 12/2018 | DeFreitas et al. |
| 2018/0348151 A1 | 12/2018 | Kasper et al. |
| 2018/0356355 A1 | 12/2018 | Momose et al. |
| 2019/0017942 A1 | 1/2019 | Filevich |
| 2019/0017946 A1 | 1/2019 | Wack et al. |
| 2019/0018824 A1 | 1/2019 | Zarkadas |
| 2019/0019647 A1 | 1/2019 | Lee et al. |
| 2019/0027265 A1 | 1/2019 | Dey et al. |
| 2019/0043689 A1 | 2/2019 | Camus |
| 2019/0057832 A1 | 2/2019 | Durst et al. |
| 2019/0064084 A1 | 2/2019 | Ullom et al. |
| 2019/0086342 A1 | 3/2019 | Pois et al. |
| 2019/0088439 A1 | 3/2019 | Honda |
| 2019/0113466 A1 | 4/2019 | Karim et al. |
| 2019/0115184 A1 | 4/2019 | Zalubovsky |
| 2019/0131103 A1 | 5/2019 | Tuohimaa |
| 2019/0132936 A1 | 5/2019 | Steck et al. |
| 2019/0154892 A1 | 5/2019 | Moldovan |
| 2019/0172681 A1 | 6/2019 | Owen et al. |
| 2019/0189385 A1 | 6/2019 | Liang et al. |
| 2019/0204246 A1 | 7/2019 | Hegeman et al. |
| 2019/0204757 A1 | 7/2019 | Brussard et al. |
| 2019/0206652 A1 | 7/2019 | Akinwande et al. |
| 2019/0212281 A1 | 7/2019 | Shchgegrov |
| 2019/0214216 A1 | 7/2019 | Jeong et al. |
| 2019/0216416 A1 | 7/2019 | Koehler et al. |
| 2019/0219713 A1 | 7/2019 | Booker et al. |
| 2019/0261935 A1 | 8/2019 | Kitamura |
| 2019/0272929 A1 | 9/2019 | Omote et al. |
| 2019/0304735 A1 | 10/2019 | Safai et al. |
| 2019/0311874 A1 | 10/2019 | Tuohimma et al. |
| 2019/0317027 A1 | 10/2019 | Tsuboi et al. |
| 2019/0341219 A1 | 11/2019 | Zhang et al. |
| 2019/0341220 A1 | 11/2019 | Parker et al. |
| 2019/0353802 A1 | 11/2019 | Steinhauser et al. |
| 2019/0374182 A1 | 12/2019 | Karim et al. |
| 2019/0380193 A1 | 12/2019 | Matsuhana et al. |
| 2019/0387602 A1 | 12/2019 | Woywode et al. |
| 2019/0391087 A1 | 12/2019 | Matejka et al. |
| 2020/0003708 A1 | 1/2020 | Kobayashi et al. |
| 2020/0003712 A1 | 1/2020 | Kataoka et al. |
| 2020/0041429 A1 | 2/2020 | Cho et al. |
| 2020/0058462 A1 | 2/2020 | Suzuki |
| 2020/0088656 A1 | 3/2020 | Pois et al. |
| 2020/0090826 A1 | 3/2020 | Adler |
| 2020/0103358 A1 | 4/2020 | Wiell et al. |
| 2020/0105492 A1 | 4/2020 | Behling et al. |
| 2020/0154552 A1 | 5/2020 | Suzuki et al. |
| 2020/0155088 A1 | 5/2020 | Gruener et al. |
| 2020/0158662 A1 | 5/2020 | Horiba et al. |
| 2020/0163195 A1 | 5/2020 | Steck et al. |
| 2020/0168427 A1 | 5/2020 | Krokhmal et al. |
| 2020/0182806 A1 | 6/2020 | Kappler et al. |
| 2020/0187339 A1 | 6/2020 | Freudenberger et al. |
| 2020/0191732 A1 | 6/2020 | Taniguchi et al. |
| 2020/0194212 A1 | 6/2020 | Dalakos et al. |
| 2020/0203113 A1 | 6/2020 | Ponard |

FOREIGN PATENT DOCUMENTS

| | | |
|---|---|---|
| CN | 102124537 A | 7/2011 |
| CN | 102325498 | 1/2012 |
| CN | 102551761 A | 7/2012 |
| EP | 0432568 | 6/1991 |
| EP | 0751533 | 1/1997 |
| EP | 1028451 | 8/2000 |
| EP | 1169713 B1 | 1/2006 |
| EP | 3093867 A1 | 11/2016 |
| FR | 2548447 | 1/1985 |
| JP | H06-188092 | 7/1994 |
| JP | H07-056000 | 3/1995 |
| JP | H07-194592 | 8/1995 |
| JP | H08-184572 | 7/1996 |
| JP | H11-304728 | 11/1999 |
| JP | 2000-306533 | 11/2000 |
| JP | 2003-149392 | 5/2003 |
| JP | 2003-288853 | 10/2003 |
| JP | 2004-089445 | 3/2004 |
| JP | 2007-218683 | 8/2007 |
| JP | 2007-265981 | 10/2007 |
| JP | 2007-311185 | 11/2007 |
| JP | 2008-200359 | 4/2008 |
| JP | 2008-145111 | 6/2008 |
| JP | 2008-197495 | 8/2008 |
| JP | 2009-195349 | 3/2009 |
| JP | 2009-212058 | 9/2009 |
| JP | 2010-236986 | 10/2010 |
| JP | 2011-029072 | 2/2011 |
| JP | 2011-218147 | 11/2011 |
| JP | 2012-032387 | 2/2012 |
| JP | 10-2012-0091591 A | 8/2012 |
| JP | 2012-187341 | 10/2012 |
| JP | 2012-254294 | 12/2012 |
| JP | 2013-508683 | 3/2013 |
| JP | 2013-157269 | 8/2013 |
| JP | 2013-160637 | 8/2013 |

(56) References Cited

FOREIGN PATENT DOCUMENTS

| JP | 2013-181811 | 9/2013 |
|---|---|---|
| JP | 2013-239317 | 11/2013 |
| JP | 2015-002074 | 1/2015 |
| JP | 2015-047306 | 3/2015 |
| JP | 2015-077289 | 4/2015 |
| WO | WO 1995/006952 | 3/1995 |
| WO | WO 1998/011592 | 3/1998 |
| WO | WO 2002/039792 | 5/2002 |
| WO | WO 2003/081631 | 10/2003 |
| WO | WO 2005/109969 | 11/2005 |
| WO | WO 2006/096052 | 9/2006 |
| WO | WO 2007/1125833 | 11/2007 |
| WO | WO 2009/098027 | 8/2009 |
| WO | WO 2009/1104560 | 8/2009 |
| WO | WO 2010/109909 | 9/2010 |
| WO | WO 2011/032572 | 3/2011 |
| WO | WO 2012/032950 | 3/2012 |
| WO | WO 2013/004574 | 1/2013 |
| WO | WO 2013/111050 | 8/2013 |
| WO | WO 2013/118593 | 8/2013 |
| WO | WO 2013/160153 | 10/2013 |
| WO | WO 2013/168468 | 11/2013 |
| WO | WO 2014/054497 | 4/2014 |
| WO | WO 2015/016019 | 2/2015 |
| WO | WO 2015/034791 | 3/2015 |
| WO | WO 2015/066333 | 5/2015 |
| WO | WO 2015/084466 | 6/2015 |
| WO | WO 2015/168473 | 11/2015 |
| WO | WO 2015/176023 | 11/2015 |
| WO | WO 2015/187219 | 12/2015 |
| WO | WO 2016/187623 | 11/2016 |
| WO | WO 2017/031740 | 3/2017 |
| WO | WO 2017/204850 | 11/2017 |
| WO | WO 2017/213996 | 12/2017 |
| WO | WO 2018/122213 | 7/2018 |
| WO | WO 2018/175570 | 9/2018 |

OTHER PUBLICATIONS

"Element Six CVD Diamond Handbook" (Element Six, Luxembourg, 2015).
"High performance benchtop EDXRF spectrometer with Windows® software," published by: Rigaku Corp., Tokyo, Japan; 2017.
"Monochromatic Doubly Curved Crystal Optics," published by: X-Ray Optical Systems, Inc. (XOS), East Greenbush, NY; 2017.
"Optics and Detectors," Section 4 of XS-Ray Data Booklet, 3rd Ed., A.C. Thompson ed. (Lawrence Berkeley Nat'l Lab, Berkeley, CA, 2009).
"Properties of Solids," Ch. 12 of CRC Handbook of Chemistry and Physics, 90th ed., Devid R. Lide & W.M. "Mickey" Haynes, eds. (CRC Press, Boca Raton, FL, 2009), pp. 12-41-12-46; 12-203-12-212.
"Science and Technology of Future Light Sources", Arthur L. Robinson (LBNL) and Brad Plummer (SLAG), eds. Report Nos. ANL-08/39 / BNL-81895-2008 / LBNL-1090E-2009 / SLAC-R-917 (Lawrence Berkeley Nal'l Lab, Berkeley, CA, Dec. 2008).
"Series 5000 Packaged X-ray Tubes," Product Technical Data Sheet DS006 Rev. G, X-Ray Technologies Inc. (Oxford Insstruments), Scotts Valley, CA (no date).
"Toward Control of Matter: Energy Science Needs for a New Class of X-Ray Light Sources" (Lawrence Berkeley Nal'l Lab, Berkeley, CA, Sep. 2008).
"X-ray Optics for BES Light Source Facilities," Report of the Basic Energy Sciences Workshop on X-ray Optics for BES Light Source Facilities, D. Mills & H. Padmore, Co-Chairs, (U.S. Dept. Of Energy, Office of Science, Potomac, MD, Mar. 2013).
Abullian et al., "Quantitative determination of the lateral density and intermolecular correlation between proteins anchored on the membrane surfaces using grazing incidence small-angle X-ray scattering and grazing incidence X-ray fluorescence," Nov. 28, 2012, The Journal of Chemical Physics, vol. 137, pp. 204907-1-204907-8.

Adachi et al., "Development of the 17-inch Direct-Conversion Dynamic Flat-panel X-ray Detector (FPD)," Digital R/F (Shimadzu Corp., 2 pages (no date, published—2004 with product release).
Aharonovich et al., "Diamond Nanophotonics," Adv. Op. Mat'ls vol. 2, Issue 10 (2014).
Als-Nielsen et al., "Phase contrast imaging" Sect. 9.3 of Ch. 9 of "Elements of Modern X-ray Physics, Second Edition" , (John Wiley & Sons Ltd, Chichester, West Sussex, UK, 2011), pp. 318-329.
Als-Nielsen et al., "Photoelectric Absorption," Ch. 7 of "Elements of Modern X-ray Physics, Second Edition," (John Wiley & Sons Ltd, Chichester, West Sussex, UK, 2011).
Als-Nielsen et al., "Refraction and reflection from interfaces," Ch. 3 of "Elements of Modern X-ray Physics, Second Edition," (John Wiley & Sons Ltd., Chichester, West Sussex, UK, 2011), pp. 69-112.
Als-Nielsen et al., "X-rays and their interaction with matter", and "Sources", Ch. 1 & 2 of "Elements of Modern X-ray Physics, Second Edition" (John Wiley & Sons Ltd, Chichester, West Sussex, UK, 2011).
Altapova et al., "Phase contrast laminography based on Talbot interferometry," Opt. Express, vol. 20, No. 6, (2012) pp. 6496-6508.
Ando et al., "Smooth and high-rate reactive ion etching of diamond," Diamond and Related Materials, vol. 11, (2002) pp. 824-827.
Arfelli et al., "Mammography with Synchrotron Radiation: Phase-Detection Techniques," Radiology vol. 215, (2000), pp. 286-293.
Arndt et al., Focusing Mirrors for Use with Microfocus X-ray Tubes, 1998, Journal of Applied Crystallography, vol. 31, pp. 733-741.
Bachucki et al., "Laboratory-based double X-ray spectrometer for simultaneous X-ray emission and X-ray absorption studies," J. Anal. Atomic Spectr. DOI:10.1039/C9JA00159J (2019).
Balaic et al., "X-ray optics of tapered capillaries," Appl. Opt. vol. 34 (Nov. 1995) pp. 7263-7272.
Baltes et al., "Coherent and incoherent grating reconstruction," J. Opt. Soc. Am. A vol. 3(8), (1986), pp. 1268-1275.
Barbee Jr., "Multilayers for x-ray optics," Opt. Eng. vol. 25 (Aug. 1986) pp. 898-915.
Baron et al., "A compact optical design for Bragg reflections near backscattering," J. Synchrotron Rad., vol. 8 (2001), pp. 1127-1130.
Bech, "In-vivo dark-field and phase-contrast x-ray imaging," Scientific Reports 3, (2013), Article No. 03209.
Bech, "X-ray imaging with a grating interferometer," University of Copenhagan PhD. Thesis, (May 1, 2009).
Bergamin et al., "Measuring small lattice distortions in Si-crystals by phase-contrast x-ray topography," J. Phys. D: Appl. Phys. vol. 33 (Dec. 31, 2000) pp. 2678-2682.
Bernstorff, "Grazing Incidence Small Angle X-ray Scattering (GISAXS)," Presentation at Advanced School on Synchrotron and Free Electron Laser Sources and their Multidisciplinary Applications, Apr. 2008, Trieste, Italy.
Bilderback et al., "Single Capillaries," Ch. 29 of "Handbook of Optics vol. III, 2nd Ed." (McGraw Hill, New York, 2001).
Birkholz, "Chapter 4: Grazing Incidence Configurations," Thin Film Analysis by X-ray Scattering (Wiley-VCH Verlag GmbH & Co. KGaA, Weinheim, Germany, 2006).
Bjeoumikhov et al., "A modular system for XRF and XRD applications consisting of a microfocus X-ray source and different capillary optics," X-ray Spectrometry, vol. 33 (2004), pp. 312-316.
Bjeoumikhov et al., "Capillary Optics for X-Rays," Ch. 18 of "Modern Developments in X-Ray and Neutron Optics," A. Erko et al., eds. (Springer, Berlin, Germany, 2008), pp. 287-306.
Canberra Model S-5005 WinAxil X-Ray Analysis Software, published by: Canberra Eurisys Benelux N.V./S.A.,Zellik, Belgium; Jun. 2004.
Cerrina, "The Schwarzschild Objective," Ch. 27 of "Handbook of Optics vol. III, 2nd Ed." (McGraw Hill, New York, 2001).
Chen et al., "Advance in detection of low sulfur content by wavelength dispersive XRF," Proceedings of the Annual ISA Analysis Division Symposium (2002).
Chen et al., "Doubly curved crystal (DCC) X-ray optics and applications," Powder Diffraction, vol. 17(2) (2002), pp. 99-103.

(56) References Cited

OTHER PUBLICATIONS

Chen et al., "Guiding and focusing neutron beams using capillary optics," Nature vol. 357 (Jun. 4, 1992), pp. 391-393.
Chervenak et al., "Experimental thick-target bremsstrahlung spectra from electrons in the range 10 to 30 keV", Phys. Rev. A vol. 12 (1975), pp. 26-33.
Chon, "Measurement of Roundness for an X-Ray Mono-Capillary Optic by Using Computed Tomography," J. Korean Phys. Soc. vol. 74, No. 9, pp. 901-906 (May 2019).
Coan et al., "In vivo x-ray phase contrast analyzer-based imaging for longitudinal osteoarthritis studies in guinea pigs," Phys. Med. Biol. vol. 55(24) (2010), pp. 7649-7662.
Cockcroft et al., "Chapter 2: Experimental Setups," Powder Diffraction: Theory and Practice, R.E. Dinnebier and S.J.L. Billinge, eds (Royal Society of Chemistry Publishing, London, UK, 2008).
Cohen et al., "Tunable laboratory extended x-ray absorption fine structure system," Rev. Sci. Instr. vol. 51, No. 3, Mar. 1980, pp. 273-277.
Cong et al., "Fourier transform-based iterative method for differential phase-contrast computed tomography", Opt. Lett. vol. 37 (2012), pp. 1784-1786.
Cornaby et al., "Advances in X-ray Microfocusing with Monocapillary Optics at CHESS," CHESS News Magazine (2009), pp. 63-66.
Cornaby et al., "Design of Single-Bounce Monocapillary X-ray Optics," Advances in X-ray Analysis: Proceedings of the 55th Annual Conference on Applications of X-ray Analysis, vol. 50, (International Centre for Diffraction Data (ICDD), 2007), pp. 194-200.
Cornaby, "The Handbook of X-ray Single Bounce Monocapillary Optics, Including Optical Design and Synchrotron Applications" (PhD Dissertation, Cornell University, Ithaca, NY, May 2008).
David et al., "Fabrication of diffraction gratings for hard x-ray phase contrast imaging," Microelectron. Eng. vol. 84, (2007), pp. 1172-1177.
David et al., "Hard X-ray phase imaging and tomography using a grating interferometer," Spectrochimica Acta Part B vol. 62 (2007) pp. 626-630.
Davis et al., "Bridging the Micro-to-Macro Gap: A New Application for Micro X-Ray Fluorescence," Microsc Microanal., vol. 17(3) (Jun. 2011), pp. 410-417.
Diaz et al., "Monte Carlo Simulation of Scatter Field for Calculation of Contrast of Discs in Synthetic CDMAM Images," In: Digital Mammography, Proceedings 10th International Workshop IWDM 2010 (Springer Verlag, Berlin Heidelberg), (2010), pp. 628-635 (9 pages). Jun. 18, 2010.
Ding et al., "Reactive Ion Etching of CVD Diamond Films for MEMS Applications," Micromachining and Microfabrication, Proc. SPIE vol. 4230 (2000), pp. 224-230.
Dobrovinskaya et al., "Thermal Properties," Sect. 2.1.5 of "Sapphire: Material, Manufacturing Applications" (Springer Science + Business Media, New York, 2009).
Dong et al., "Improving Molecular Sensitivity in X-Ray Fluorescence Molecular Imaging (XFMI) of Iodine Distribution in Mouse-Sized Phantoms via Excitation Spectrum Optimization," IEEE Access, vol. 6, pp. 56966-56976 (2018).
Erko et al., "X-ray Optics," Ch. 3 of "Handbook of Practical X-Ray Fluorescence Analysis," B. Beckhoff et al., eds. (Springer, Berlin, Germany, 2006), pp. 85-198.
Falcone et al., "New directions in X-ray microscopy," Contemporary Physics, vol. 52, No. 4, (Jul.-Aug. 2010), pp. 293-318.
Fernandez-Ruiz, "TXRF Spectrometry as a Powerful Tool for the Study of Metallic Traces in Biological Systems," Development in Analytical Chemistry, vol. 1 (2014), pp. 1-14.
Freund, "Mirrors for Synchrotron Beamlines," Ch. 26 of "Handbook of Optics vol. III, 2nd Ed." (McGraw Hill, New York, 2001).
Ge et al., "Investigation of the partially coherent effects in a 2D Talbot interferometer," Anal. Bioanal. Chem. vol. 401, (2011), pp. 865-870. Apr. 29, 2011 pub Jun. 14, 2011.
Gibson et al., "Polycapillary Optics: An Enabling Technology for New Applications," Advances in X-ray Analysis, vol. 45 (2002), pp. 286-297.
Gonzales et al., "Angular Distribution of Bremsstrahlung Produced by 10-Kev and 20 Kev Electrons Incident on a Thick Au Target", in Application of Accelerators in Research and Industry, AIP Conf. Proc. 1221 (2013), pp. 114-117.
Gonzales et al., "Angular distribution of thick-target bremsstrahlung produced by electrons with initial energies ranging from 10 to 20 keV incident on Ag", Phys. Rev. A vol. 84 (2011): 052726.
Günther et al., "Full-field structured-illumination super-responution X-ray transmission microscopy," Nature Comm. 10:2494 (2019) and supplementary information.
Guttmann et al., "Ellipsoidal capillary as condenser for the BESSSY full-field x-ray microscope," J. Phys. Conf. Ser. vol. 186 (2009): 012064.
Harasse et al., "Iterative reconstruction in x-ray computed laminography from differential phase measurements", Opt. Express. vol. 19 (2011), pp. 16560-16573.
Harasse et al., "X-ray Phase Laminography with a Grating Interferometer using Iterative Reconstruction", in International Workshop on X-ray and Neutron Phase Imaging with Gratings, AIP Conf. Proc. vol. 1466, (2012), pp. 163-168.
Harasse et al., "X-ray Phase Laminography with Talbot Interferometer", in Developments in X-Ray Tomography VII, Proc. SPIE vol. 7804 (2010), 780411.
Hasse et al., "New developments in laboratory-based x-ray sources and optics," Adv. In Laboratory-based X-Ray Sources, Optics, and Applications VI, ed. A.M. Khounsary, Proc. SPIE vol. 10387, 103870B-1 (2017).
Hemraj-Benny et al., "Near-Edge X-ray Absorption Fine Structure Spectroscopy as a Tool for Investigating Nanomaterials," Small, vol. 2(1), (2006), pp. 26-35.
Henke et al., "X-ray interactions: photoabsorption, scattering, transmission, and reflection at E=50-30000 eV, Z=1-92," Atomic Data and Nuclear Data Tables, vol. 54 (No. 2) (Jul. 1993), pp. 181-342.
Hennekam et al., "Trace metal analysis of sediment cores using a novel X-ray fluorescence core scanning method," Quaternary Int'l, https://doi.org/10.1016/j.quaint.2018.10.018 (2018).
Honma et al., Full-automatic XAFS Measurement System of the Engineering Science Research II beamline BL14B2 at Spring-8, 2011, AIP Conference Proceedings 1234, pp. 13-16.
Howard et al., "High-Definition X-ray Fluorescence Elemental Mapping of Paintings," Anal. Chem., 2012, vol. 84(7), pp. 3278-3286.
Howells, "Gratings and Monochromators in the VUV and Soft X-Ray Spectral Region," Ch. 21 of Handbook of Optics vol. III, 2nd Ed. (McGraw Hill, New York, 2001).
Howells, "Mirrors for Synchrotron-Radiation Beamlines," Publication LBL-34750 (Lawrence Berkeley Laboratory, Berkeley, CA, Sep. 1993).
Hrdy et al, "Diffractive-Refractive Optics: X-ray Crystal Monochromators with Profiled Diffracting Surfaces," Ch. 20 of "Modern Developments in X-Ray and Neutron Optics," A. Erko et al., eds. (Springer, Berlin Heidelberg New York, 2008).
Hwang et al, "New etching process for device fabrication using diamond," Diamond & Related Materials, vol. 13 (2004) pp. 2207-2210.
Ide-Ektessabi et al., "The role of trace metallic elements in neurodegenerative disorders: quantitative analysis using XRF and XANES spectroscopy," Anal. Sci., vol. 21(7) (Jul. 2005), pp. 885-892.
Ihsan et al., "A microfocus X-ray tube based on a microstructured X-ray target", Nuclear Instruments and Methods in Physics Research B vol. 267 (2009) pp. 3566-3573.
Ishisaka et al., "A New Method of Analyzing Edge Effect in Phase Contrast Imaging with Incoherent X-rays," Optical Review, vol. 7, No. 6, (2000), pp. 566-572.
Ito et al., "A Stable In-Laboratory EXAFS Measurement System," Jap. J. Appl. Phys., vol. 22, No. 2, Feb. 1, 1983, pp. 357-360.
Itoh et al., "Two-dimensional grating-based X-ray phase-contrast imaging using Fourier transform phase retrieval," Op. Express, vol. 19, No. 4 (2011) pp. 3339-3346.

(56) References Cited

OTHER PUBLICATIONS

Janssens et al, "Recent trends in quantitative aspects of microscopic X-ray fluorescence analysis," TrAC Trends in Analytical Chemistry 29.6 (Jun. 2010): 464-478.

Jahrman et al., "Vacuum formed temporary spherically and toroidally bent crystal analyzers for x-ray absorption and x-ray emission spectroscopy," Rev. Sci. Inst. vol. 90, 013106 (2019).

Jiang et al., "X-Ray Phase-Contrast Imaging with Three 2D Gratings," Int. J. Biomed. Imaging, (2008), 827152, 8 pages.

Joy, "Astronomical X-ray Optics," Ch. 28 of "Handbook of Optics vol. III, 2nd Ed.," (McGraw Hill, New York, 2001).

Kalasová et al., "Characterization of a laboratory-based X-ray computed nonotomography system for propagation-based method of phase contrast imaging," IEEE Trans. On Instr. And Meas., DOI 10.1109/TIM.2019.2910338 (2019).

Keyrilainen et al., "Phase contrast X-ray imaging of breast," Acta Radiologica, vol. 51 (8), (2010), pp. 866-884. Jan. 1, 2010 pub Jun. 15, 2010.

Kidalov et al., "Thermal Conductivity of Diamond Composites," Materials, vol. 2 (2009) pp. 2467-2495.

Kido et al., "Bone Cartilage Imaging with X-ray Interferometry using a Practical X-ray Tube", in Medical Imaging 2010: Physics of Medical Imaging, Proc. SPIE vol. 7622 (2010), 762240.

Kim, "Talbot images of wavelength-scale amplitude gratings," Opt. Express vol. 20(5), (2012), pp. 4904-4920.

Kim et al., "Observation of the Talbot Effect at Beamline 6C Bio Medical Imaging of he Pohang Light Source-II," J. Korean Phys. Soc., vol. 74, No. 10, pp. 935-940 (May 2019).

Kirkpatrick et al., "Formation of Optical Images by X-Rays", J. Opt. Soc. Am. vol. 38(9) (1948), pp. 766-774.

Kirz, "Phase zone plates for x rays and the extreme uv," J. Op. Soc. Am. vol. 64 (Mar. 1974), pp. 301-309.

Kirz et al., "The History and Future of X-ray Microscopy", J. Physics: Conden. Series vol. 186 (2009): 012001.

Kiyohara et al., "Development of the Talbot-Lau Interferometry System Available for Clinical Use", in International Workshop on X-ray and Neutron Phase Imaging with Gratings, AIP Cong. Proc. vol. 1466, (2012), pp. 97-102.

Klockenkämper et al., "7.1 Instrumental Developments" and "7.3 Future Prospects by Combinations," from Chapter 7 of Total Reflection X-ray Fluorescence Analysis and Related Methods 2nd Ed. (J. Wiley and Sons, Hoboken, NJ, 2015).

Klockenkämper et al., "Chapter 3: Instrumentation for TXRF and GI-XRF," Total Reflection X-ray Fluorescence Analysis and Related Methods 2nd Ed. (J. Wiley and Sons, Hoboken, NJ, 2015).

Kottler et al., "A two-directional approach for grating based differential phase contrast imaging using hard x-rays," Opt. Express vol. 15(3), (2007), pp. 1175-1181.

Kottler et al., "Dual energy phase contrast x-ray imaging with Talbot-Lau interferometer," J. Appl. Phys. vol. 108(11), (2010), 114906. Jul. 7, 2010 pub Dec. 7, 2010.

Kumakhov et al., "Multiple reflection from surface X-ray optics," Physics Reports, vol. 191(5), (1990), pp. 289-350.

Kumakhov, "X-ray Capillary Optics. History of Development and Present Status" in Kumakhov Optics and Application, Proc. SPIE 4155 (2000), pp. 2-12.

Kuwabara et al., "Hard-X-ray Phase-Difference Microscopy with a Low-Brilliance Laboratory X-ray Source", Appl. Phys. Express vol. 4 (2011) 062502.

Kuznetsov, "X-Ray Optics Calculator," Institute of Microelectronics Technology and High Purity Materials, Russian Academy of Sciences (IMT RAS), Chernogolovka, Russia (6 pages submitted); 2016.

Lagomarsino et al., "Reflective Optical Arrays," Ch. 19 of "Modern Developments in X-Ray and Neutron Optics," A. Erko et al. eds. (Springer, Berlin, Germany, 2008), pp. 307-317.

Lai, "X-Ray Microfocusing Optics," Slide Presentation from Argonne National Laboratory, 71 slides, Cheiron Summer School 2007.

Langhoff et al., "X-ray Sources," Ch. 2 of "Handbook of Practical X-Ray Fluorescence Analysis," B. Beckhoff et al., eds. (Springer, Berlin Heidelberg New York, 2006), pp. 33-82.

Lechner et al., "Silicon drift detecors for high count rate X-ray spectroscopy at room temperature," Nuclear Instruments and Methods, vol. 458A (2001), pp. 281-287.

Leenaers et al., "Application of Glancing Incidence X-ray Analysis," 1997, X-ray Spectrometry, vol. 26, pp. 115-121.

Lengeler et al., "Refractive X-ray Optics," Ch. 20 of "Handbook of Optics vol. III, 2nd Ed." (McGraw Hill, New York, 2001).

Li et al., "Source-optic-crystal optimisation for compact monochromatic imaging," Proc. SPIE 5537 (2004), pp. 105-114.

Li et al., "X-ray phase-contrast imaging using cascade Talbot-Lau interferometers," Proc. SPIE 10964 (2018), pp. 1096469-1-1096469-6.

Lohmann et al., "An interferometer based on the Talbot effect," Optics Communications vol. 2 (1971), pp. 413-415.

Lübcke et al., "Soft X-ray nanoscale imaging using a sub-pixel resolution charge coupled device (CCD) camera," Ref. Sci. Instrum. vol. 90, 043111 (2019).

Lühl et al., "Scanning transmission X-ray microscopy with efficient X-ray fluorescence detection (STXM-XRF) for biomedical applications in the soft and tender energy range," J. Synch. Rad. vol. 26, https://doi.org/10.1107/S1600577518016879, (2019).

Macdonald et al., "An Introduction to X-ray and Neutron Optics," Ch. 19 of "Handbook of Optics vol. III, 2nd Ed." (McGraw Hill, New York, 2001).

Macdonald et al., "Polycapillary and Multichannel Plate X-Ray Optics," Ch. 30 of "Handbook of Optics vol. III, 2nd Ed.," (McGraw Hill, New York, 2001).

Macdonald et al., "Polycapillary X-ray Optics for Microdiffraction," J. Appl. Cryst., vol. 32 (1999) pp. 160-167.

Macdonald, "Focusing Polycapillary Optics and Their Applications," X-Ray Optics and Instrumentation, vol. 2010, (Oct. 2010): 867049.

Maj et al., "Etching methods for improving surface imperfections of diamonds used for x-ray monochromators," Adv. X-ray Anal., vol. 48 (2005), pp. 176-182.

Malgrange, "X-ray Optics for Synchrotron Radiation," Acta Physica Polinica A, vol. 82(1) (1992) pp. 13-32.

Malzer et al., "A laboratory spectrometer for high throughput X-ray emission spectroscopy in catalysis research," Rev. Sci. Inst. 89, 113111 (2018).

Masuda et al., "Fabrication of Through-Hole Diamond Membranes by Plasma Etching Using Anodic Porous Alumina Mask," Electrochemical and Solid-State Letters, vol. 4(11) (2001) pp. G101-G103.

Matsushita, "Mirrors and Multilayers," Slide Presentation from Photon Factor, Tsukuba, Japan, 65 slides, (Cheiron School 2009, Sprint-8, Japan, Nov. 2009).

Matsushita, "X-ray monochromators," Slide Presentation from Photon Factory, Tsukuba, Japan, 70 slides, (Cheiron School 2009, Spring-8, Japan, Nov. 2009).

Matsuyama et al., "Wavefront measurement for a hard-X-ray nanobeam using single-grating interferometry", Opt Express vol. 20 (2012), pp. 24977-24986.

Miao et al., "Motionless phase stepping in X-ray phase contrast imaging with a compact source," Proceedings of the National Academy of Sciences, vol. 110(48), (2013), pp. 19268-19272.

Michette, "Zone and Phase Plates, Bragg-Fresnel Optics," Ch. 23 of "Handbook of Optics vol. III, 2nd Ed.," (McGraw Hill, New York, 2001).

Mizutani et al., X-ray microscopy for neural circuit reconstruction in 9th International Conference on X-Ray Microscopy, J. Phys: Conf. Ser. 186 (2009) 012092.

Modregger et al., "Grating-Based X-ray Phase Contrast Imaging," Ch. 3 of Emerging Imaging Technologies in Medicine, M. Anastasio & P. La Riviere, ed., CRC Press, Boca Raton, FL, (2012), pp. 43-56.

Momose et al., "Biomedical Imaging by Talbot-Type X-Ray Phase Tomography" in Developments in X-Ray Tomography V, Proc. SPIE vol. 6318 (2006) 63180T.

Momose et al., "Grating-Based X-ray Phase Imaging Using Multiline X-ray Source", Jpn. J. Appl. Phys. vol. 48 (2009), 076512.

(56) References Cited

OTHER PUBLICATIONS

Momose et al., "Phase Tomography by X-ray Talbot Interferometry for Biological Imaging" Jpn. J. Appl. Phys. vol. 45 2006 pp. 5254-5262.
Momose et al., "Phase Tomography Using X-ray Talbot Interferometer", in Synchrotron Radiation Instrumentation: Ninth International Conference, AIP Conf. Proc. vol. 879 (2007), pp. 1365-1368.
Momose et al., "Phase-Contrast X-Ray Imaging Using an X-Ray Interferometer for Biological Imaging", Analytical Sciences vol. 17 Supplement (2001), pp. i527-i530.
Momose et al., "Sensitivity of X-ray Phase Imaging Based on Talbot Interferometry", Jpn. J. Appl. Phys. vol. 47 (2008), pp. 8077-8080.
Momose et al., "X-ray Phase Measurements with Talbot Interferometry and Its Applications", in International Conference on Advanced Phase Measurement Methods in Optics and Imaging, AIP Conf. Proc. vol. 1236 (2010), pp. 195-199.
Momose et al., "X-ray Phase Imaging—From Static Observation to Dynamic Observation—", in International Workshop on X-ray and Neutron Phase Imaging with Gratings AIP Conf. Proc. vol. 1466, (2012), pp. 67-77.
Momose et al., "X-ray Phase Imaging Using Lau Effect", Appl. Phys. Express vol. 4 (2011) 066603.
Momose et al., "X-Ray Phase Imaging with Talbot Interferometry", in "Biomedical Mathematics: Promising Directions in Imaging, Therapy Planning, and Inverse Problems", Y. Censor, M. Jiang & G.Wang, eds. (Medical Physics Publishing, Madison, WI, USA, 2010), pp. 281-320.
Momose et al., "X-ray phase tomography with a Talbot interferometer in combination with an X-ray imaging microscope", in 9th International Conference on X-Ray Microscopy, J. Phys: Conf. Ser. 186 (2009) 012044.
Momose et al., "X-ray Talbot Interferometry with Capillary Plates", Jpn. J. Appl. Phys. vol. 45 (2006), pp. 314-316.
Momose et al., "Four-dimensional X-ray phase tomography with Talbot interferometry and white synchrotron radiation: dynamic observation of a living worm", Opt. Express vol. 19 (2011), pp. 8423-8432.
Momose et al., "High-speed X-ray phase imaging and X-ray phase tomography with Talbot interferometer and white synchrotron radiation", Opt. Express vol. 17 (2009), pp. 12540-12545.
Momose et al., "Phase Imaging with an X-ray Talbot Interferometer", Advances in X-ray Analysis vol. 49(3) (2006), pp. 21-30.
Momose et al.,"Demonstration of X-Ray Talbot Interferometry", Jpn. J. Appl. Phys. vol. 42 (2003), pp. L866-L868.
Momose et al.,"Phase Tomography Using an X-ray Talbot Interferometer", in Developments in X-Ray Tomography IV, Proc. SPIE vol. 5535 (2004), pp. 352-360.
Momose, "Recent Advances in X-ray Phase Imaging", Jpn. J. Appl. Phys. vol. 44 (2005), pp. 6355-6367.
Montgomery, "Self Imaging Objects of Infinite Aperture," J. Opt. Soc. Am. vol. 57(6), (1967), pp. 772-778.
Morimoto et al., "Development of multiline embedded X-ray targets for X-ray phase contrast imaging," XTOP 2012 Book of Abstracts, (Ioffe Physical-Technical Institute of the Russian Academy of Sciences, St. Petersburg, Russia, 2012), pp. 74-75.
Morimoto et al., "X-ray phase contrast imaging by compact Talbot-Lau interferometer with a signal transmission grating," 2014, Optics Letters, vol. 39, No. 15, pp. 4297-4300.
Morimoto et al., "Design and demonstration of phase gratings for 2D single grating interferometer," Optics Express vol. 23, No. 23, 29399 (2015).
Munro et al., Design of a novel phase contrast imaging system for mammography, 2010, Physics in Medicine and Biology, vol. 55, No. 14, pp. 4169-4185.
Nango et al., "Talbot-defocus multiscan tomography using the synchrotron X-ray microscope to study the lacuno-canalicular network in mouse bone", Biomed. Opt. Express vol. 4 (2013), pp. 917-923.
Neuhausler et al., "Non-destructive high-resolution X-ray imaging of ULSI micro-electronics using keV X-ray microscopy in Zernike phase contrast," Microelectronic Engineering, Elsevier Publishers BV., Amsterdam, NO, vol. 83, No. 4-9 (Apr. 1, 2006) pp. 1043-1046.
Newville, "Fundamentals of XAFS," (Univ. of Chicago, Chicago, IL, Jul. 23, 2004).
Noda et al., "Fabrication of Diffraction Grating with High Aspect Ratio Using X-ray Lithography Technique for X-ray Phase Imaging," Jpn. J. Appl. Phys. vol. 46, (2007), pp. 849-851.
Noda et al., "Fabrication of High Aspect Ratio X-ray Grating Using X-ray Lithography" J. Solid Mech_ Mater. Eng. vol. 3 (2009), pp. 416-423.
Nojeh, "Carbon Nanotube Electron Sources: From Electron Beams to Energy Conversion and Optophononics", ISRN Nanomaterials vol. 2014 (2014): 879827.
Nuhn, "From storage rings to free electron lasers for hard x-rays", J.A37 Phys.: Condens. Matter vol. 16 (2004), pp. S3413-S34121.
Nykanen et al., "X-ray scattering in full-field digital mammography," Med. Phys. vol. 30(7), (2003), pp. 1864-1873.
Oji et al., Automatic XAFS measurement system developed at BL14B2 in SPring-8, Available online Nov. 15, 2011, Journal of Synchrotron Radiation, vol. 19, pp. 54-59.
Olbinado et al., "Demonstration of Stroboscopic X-ray Talbot Interferometry Using Polychromatic Synchrotron and Laboratory X-ray Sources", Appl. Phys. Express vol. 6 (2013), 096601.
Ortega et al., "Bio-metals imaging and speciation in cells using proton and synchrotron radiation X-ray microspectroscopy," J. Royal Society Interface vol. 6 suppl. 5 (Oct. 6, 2009), pp. 6S649-6S658.
Otendal et al., A 9 keV electron-impact liquid-gallium-jet x-ray source, Rev. Sci. Instrum. vol. 79 (2008): 016102.
Oxford Instruments Inc., Series 5000 Model XTF5011 X-ray Tube information, Jun. 1998, 3 pages.
Parrill et al., "GISAXS—Glancing Incidence Small Angle X-ray Scattering," Journal de Physique IV, vol. 3 (Dec. 1993), pp. 411-417.
Paxscan Flat Panel X-ray Imaging, Varian Sales Brochure, (Varian Medical Systems, Palo Alto, CA, Nov. 11, 2004).
Pfeiffer et al., "Hard-X-ray dark-field imaging using a grating interferometer," Nature Materials vol. 7, (2008), pp. 134-137.
Pfeiffer et al., "Hard x-ray phase tomography with low brilliance x-ray sources," Phys. Rev. Lett. vol. 98, (2007), 108105.
Pfeiffer et al., "Phase retrieval and differential phase-contrast imaging with low-brilliance X-ray sources," Nature Physics vol. 2, (2006), pp. 258-261.
Pfeiffer, "Milestones and basic principles of grating-based x-ray and neutron phase-contrast imaging," in International Workshop on X-ray and Neutron Phase Imaging with Gratings AIP Conf. Proc. vol. 1466, (2012), pp. 2-11.
Pianetta et al., "Application of synchrotron radiation to TXRF analysis of metal contamination on silicon wafer surfaces," Thin Solid Films, vol. 373(1-2), 2000, pp. 222-226.
Potts, "Electron Probe Microanalysis", Ch. 10 of "A Handbook of Silicate Rock Analysis" (Springer Science + Business Media, New York, 1987), pp. 326-382 (equation quoted from p. 336).
Prewitt et al., "FIB Repair of 5X Recticles and Effects on IC Quality," Integrated Circuit Metrology, Inspection, and Process Control VII, Proc. SPIE vol. 1926 (1993), pp. 517-526.
Prewitt et al., "Focused ion beam repair: staining of photomasks and reticles," J. Phys. D Appl. Phys. vol. 26 (1993), pp. 1135-1137.
Prewitt et al., "Gallium Staining in FIB Repair of Photomasks," Microelectronic Engineering, vol. 21 (1993), pp. 191-196.
Pushie et al., "Elemental and Chemically Specific X-ray Fluorescence Imaging of Biological Systems," Chem. Rev. 114:17, 8499-8541 (2014).
Pushie et al., "Prion protein expression level alters regional copper, iron and zinc content in the mouse brain," Metallomics vol. 3, 206-214 (2011).
Qin et al., "Trace metal imaging with high spatial resolution: Applications in biomedicine," Metallomics, vol. 3 (Jan. 2011), pp. 28-37.
Rayleigh, "On copying diffraction gratings and some phenomena connected therewith," Philos. Mag. vol. 11 (1881), pp. 196-205.

(56) References Cited

OTHER PUBLICATIONS

Renaud et al., "Probing surface and interface morphology with Grazing Incidence Small Angle X-ray Scattering," Surface Science Reports, vol. 64:8 (2009), pp. 255-380.
Riege, "Electron Emission from Ferroelectrics—A Review", CERN Report CERN AT/93-18 (CERN, Geneva, Switzerland, Jul. 1993).
Rix et al., "Super-Resolution X-ray phase-contrast and dark-field imaging with a single 2D grating and electromagnetic source stepping," Phys. Med. Biol. In press https://doi.org/10.1088/1361-6560/ab2ff5 (2019).
Röntgen, Ueber eine neue Art von Strahlen (Wurzburg Verlag, Warzburg, Germany, 1896) also, in English, "On a New Kind of Rays," Nature vol. 53 (Jan. 23 1896). pp. 274-276.
Rovezzi, "Study of the local order around magnetic impurities in semiconductors for spintronics." PhD Dissertation, Condensed Matter, Université Joseph-Fourier—Grenoble I, 2009, English <tel-00442852>.
Rutishauser, "X-ray grating interferometry for imaging and metrology," 2003, Eth Zurich, Diss. ETH No. 20939.
Sato et al., Two-dimensional gratings-based phase-contrast imaging using a conventional x-ray tube, 2011, Optics Letters, vol. 36, No. 18, pp. 3551-3553.
Scherer et al., "Bi-Directional X-Ray Phase-Contrast Mammography," PLoS ONE, vol. 9, Issue 5 (May 2014) e93502.
Scholz, "X-ray Tubes and Monochromators," Technical Workshop EPIV, Universität Würzburg (2007); 41 slides, 2007.
Scholze et al., "X-ray Detectors and XRF Detection Channels," Ch. 4 of "Handbook of Practical X-Ray Fluorescence Analysis," B. Beckhoff et al., eds. (Springer, Berlin Heidelberg, Germay, 2006), pp. 85-198.
Scordo et al., "Pyrolitic Graphite Mosaic Drystal Thickness and Mosaicity Optimization for an Extended Source Von Hamos X-ray Spectrometer," Condens. Matter Vo. 4, pp. 38-52 (2019).
Scott, "Hybrid Semiconductor Detectors for High Spatial Resolution Phase-contrast X-ray Imaging," Thesis, University of Waterloo, Department of Electrical and Computer Engineering, 2019.
Sebert, "Flat-panel detectors:how much better are they?" Pediatr. Radiol. vol. 36 (Suppl 2), (2006), pp. 173-181.
Seifert et al., "Talbot-Lau x-ray phase-contrast setup for fast scanning of large samples," Sci. Rep. 9:4199, pp. 1-11 (2019).
Shen, "Polarizing Crystal Optics," Ch. 25 of "Handbook of Optics vol. III, 2nd Ed.," (McGraw Hill, New York, 2001).
Shields et al., "Overview of Polycapillary X-ray Optics," Powder Diffraction, vol. 17(2) (Jun. 2002), pp. 70-80.
Shimura et al., "Hard x-ray phase contrast imaging using a tabletop Talbot-Lau interferometer with multiline embedded x-ray targets", Opt. Lett. vol. 38(2) (2013), pp. 157-159.
Siddons, "Crystal Monochromators and Bent Crystals," Ch. 22 of "Handbook of Optics vol. III, 2nd Ed.," (McGraw Hill, New York, 2001).
Smith, "Fundamentals of Digital Mammography:Physics, Technology and Practical Considerations," Publication R-BI-016 (Hologic, Inc., Bedford, MA, Mar. 2005).
Snigirev et al., "Hard X-Ray Microoptics," Ch. 17 of "Modern Developments in X-Ray and Neutron Optics," A. Erko et al., eds (Springer, Berlin, Germany, 2008), pp. 255-285.
Sparks Jr., "X-ray Fluorescence Microprobe for Chemical Analysis," in Synchrotron Radiation Research, H. Winick & S. Doniach, eds. (Plenum Press, New York, NY 1980), pp. 459-512.
Spiller, "Multilayers," Ch. 24 of "Handbook of Optics vol. III, 2nd Ed.," (McGraw Hill, New York, 2001).
Stampanoni et al., "The First Analysis and Clinical Evaluation of Native Breast Tissue Using Differential Phase-Contrast Mammography," Investigative Radiology, vol. 46, pp. 801-806. pub 2011-12-xx.
Strüder et al., "Silicon Drift Detectors for X-ray Imaging," Presentation at Detector Workshop on Synchrotron Radiation Instrumentation, 54 slides, (Argonne Nat'l Lab, Argonne, IL Dec. 8, 2005), available at: <http://www.aps.anl.gov/News/Conferences/2005/Synchrotron_Radiation_Instrumentation/Presentations/Strueder.pdf>.
Strüder et al., "X-Ray Detectors," Ch. 4 of "X-ray Spectrometry: Recent Technological Advances," K. Tsuji et al. eds. (John Wiley & Sons, Ltd. Chichester, West Sussex, UK, 2004), pp. 63-131.
Stupple et al., "Modeling of Heat Transfer in an Aluminum X-Ray Anode Employing a Chemical Vapor Deposited Diamond Heat Spreader," J. Heat Transfer, Vo. 140, 124501-1-5 (Dec. 2018).
Sun et al., "Combined optic system based on polycapillary X-ray optics and single-bounce monocapillary optics for focusing X-rays from a conventional laboratory X-ray source," Nucl. Inst. and Methods in Phys. Res. A 802 (2015) pp. 5-9.
Sun et al., "Numerical design of in-line X-ray phase-contrast imaging based on ellipsoidal single-bounce monocapillary," Nucl. Inst. And Methods in Phys. Res. A746 (2014) pp. 33-38.
Sunday et al., "X-ray Metrology for the Semiconductor Industry Tutorial," J. Res. Nat'l Inst. Stan. vol. 124: 124003 (2019); https://doi.org/10.6028/jres.124.003.
Suzuki et al., "Hard X-ray Imaging Microscopy using X-ray Guide Tube as Beam Condenser for Field Illumination," J. Phys.: Conf. Ser. vol. 463 (2013): 012028.
Suzuki, "Development of the DIGITEX Safire Cardiac System Equipped with Direct conversion Flat Panel Detector," Digital Angio Technical Report (Shimadzu Corp., Kyoto, Japan, no date, published—2004 with product release).
Takahama, "RADspeed safire Digital General Radiography System Equipped with New Direct-Conversion FPD," Medical Now, No. 62 (2007),.
Takeda et al., "Differential Phase X-ray Imaging Microscopy with X-ray Talbot Interferometer" Appl. Phys. Express vol. 1 (2008) 117002.
Takeda et al., "X-Ray Phase Imaging with Single Phase Grating", Jpn. J. Appl. Phys. vol. 46 (2007), pp. L89-L91.
Takeda et al., "In vivo physiological saline-infused hepatic vessel imaging using a two-crystal-interferometer-based phase-contrast X-ray technique", J. Synchrotron Radiation vol. 19 (2012), pp. 252-256.
Talbot, "Facts relating to optical science No IV," Philos. Mag. vol. 9 (1836), pp. 401-407.
Tanaka et al., "Cadaveric and in vivo human joint imaging based on differential phase contrast by X-ray Talbot-Lau interferometry", Z. Med. Phys. vol. 23 (2013), pp. 222-227.
Tang et al., "Micro-computed tomography (Micro-CT): a novel appraoch for intraoperative breast cancer specimen imaging," Breast Cancer Res. Treat. vol. 139, pp. 311-316 (2013).
Taniguchi et al., "Diamond nanoimprint lithography," Nanotechnology, vol. 13 (2002) pp. 592-596.
Terzano et al., Recent advances in analysis of trace elements in environmental samples by X-ray based techniques (IUPAC Technical Report), Pure Appl. Chem. 2019.
Tkachuk et al., "High-resolution x-ray tomography using laboratory sources", in Developments in X-Ray Tomography V, Proc. SPIE 6318 (2006): 631810.
Tkachuk et al., "Multi-length scale x-ray tomography using laboratory and synchrotron sources", Microsc. Microanal. vol. 13 (Suppl. 2) (2007), pp. 1570-1571.
Töpperwien et al., "Multiscale x-ray phase-contrast tomography in a mouse model of transient focal cerebral ischemia," Biomed. Op. Express, vol. 10, No. 1, Jan. 2019, pp. 92-103.
Touzelbaev et al., "Applications of micron-scale passive diamond layers for the integrated circuits and microelectromechanical systems industries," Diamond and Rel. Mat'ls, vol. 7 (1998) pp. 1-14.
Tsuji et al., "X-Ray Spectrometry: Recent Technological Acvances," John Wiley & Sons Ltd. Chichester, West Susses, UK 2004), Chapters 1-7.
Udagawa, "An Introduction to In-House EXAFS Facilities," The Rigaku Journal, vol. 6, (1) (1989), pp. 20-27.
Udagawa, "An Introduction to X-ray Absorption Fine Structure," The Rigaku Journal, vol. 11(2)(1994), pp. 30-39.
Uehara et al., "Effectiveness of X-ray grating interferometry for non-destructive inspection of packaged devices", J. Appl. Phys. vol. 114 (2013), 134901.

(56) References Cited

OTHER PUBLICATIONS

Viermetz et al., "High resolution laboratory grating-based X-ray phase-contrast CT," Scientific Reports 8:15884 (2018).

Vogt, "X-ray Fluorescence Microscopy: A Tool for Biology, Life Science and Nanomedicine," Presentation on May 16, 2012 at James Madison Univ., Harrisonburg, VA (31 slides), 2012.

Wan et al.,"Fabrication of Multiple Slit Using Stacked-Sliced Method for Hard X-ray Talbot—Lau Interferometer", Jpn. J. Appl. Phys. vol. 47 (2008), pp. 7412-7414.

Wang et al., "Advantages of intermediate X-ray energies in Zernicke phase constrast X-ray microscopy," Biotech. Adv., vol. 31 (2013) pp. 387-392.

Wang et al., "Non-invasive classification of microcalcifications with phase-contrast X-ray mammography," Nature Comm. vol. 5:3797, pp. 1-9 (2014).

Wang, On the single-photon-counting (SPC) modes of imaging using an XFEL source, presented at IWORLD2015.

Wang et al., "Precise patterning of diamond films for MEMS application" Journal of Materials Processing Technology vol. 127 (2002), pp. 230-233.

Wang et al., "Measuring the average slope error of a single-bounce ellopsoidal glass monocapillary X-ray condenser based on an X-ray source with an adjustable source size," Nucl. Inst. And Meth. A934, 36-40 (2019).

Wang et al., "High beam-current density of a 10-keV nano-focus X-ray source," Nucl. Inst. And Meth. A940, 475-478 (2019).

Wansleben et al., "Photon flux determination of a liquid-metal jet x-ray source by means of photon scattering," arXiv:1903.06024v1, Mar. 14, 2019.

Weitkamp et al., "Design aspects of X-ray grating interferometry," in International Workshop on X-ray and Neutron Phase Imaging with Gratings AIP Conf. Proc. vol. 1466, (2012), pp. 84-89.

Weitkamp et al., "Hard X-ray phase imaging and tomography with a grating interferometer," Proc. SPIE vol. 5535, (2004), pp. 137-142.

Weitkamp et al., "X-ray wavefront diagnostics with Talbot interferometers," International Workshop on X-Ray Diagnostics and Scientific Application of the European XFEL, Ryn, Poland, (2010), 36 slides.

Weitkamp et al., Tomography with grating interferometers at low-brilliance sources, 2006, SPIE, vol. 6318, pp. 0S-1-0S-10.

Weitkamp et al., "X-ray phase imaging with a grating interferometer," Opt. Express vol. 13(16), (2005), pp. 6296-6304.

Weitkamp et al., "X-ray wavefront analysis and optics characterization with a grating interferometer," Appl. Phys. Lett. vol. 86, (2005), 054101.

Wen et al., "Fourier X-ray Scattering Radiography Yields Bone Structural Information," Radiology, vol. 251 (2009) pp. 910-918.

Wen et al., "Single-shot x-ray differential phase-contrast and diffraction imaging using two-dimensional transmission gratings," Op. Lett. vol. 35, No. 12, (2010) pp. 1932-1934.

Wittry et al., "Properties of fixed-position Bragg diffractors for parallel detection of x-ray spectra," Rev. Sci. Instr. vol. 64, pp. 2195-2200 (1993).

Wobrauschek et al., "Energy Dispersive, X-Ray Fluorescence Analysis," Encyclopedia of Analytical Chemistry, R.A. Meyers, Ed. (Wiley 2010).

Wobrauschek et al., "Micro XRF of light elements using a polycapillary lens and an ultra-thin window Silicon Drift Detector inside a vacuum chamber," 2005, International Centre for Diffraction Data 2005, Advances in X-ray Analysis, vol. 48, pp. 229-235.

Wolter, "Spiegelsysteme streifenden Einfalls als abbildende Optiken fur Rontgenstrahlen" [Grazing Incidence Reflector Systems as Imaging Optics for X-rays] Annalen der Physik vol. 445, Issue 1-2 (1952), pp. 94-114.

X-ray-Optics.de Website, http://www.x-ray-optics.de/, accessed Feb. 13, 2016.

Yakimchuk et al., "Ellipsoidal Concentrators for Laboratory X-ray Sources: Analytical approaches for optimization," Mar. 22, 2013, Crystallography Reports, vol. 58, No. 2, pp. 355-364.

Yamamoto, "Fundamental physics of vacuum electron sources", Reports on Progress in Physics vol. 69, (2006), pp. 181-232.

Yanagihara et al., "X-Ray Optics," Ch. 3 of "X-ray Spectrometry: Recent Technological Advances," K. Tsuji et al. eds. (John Wiley & Sons, Ltd. Chichester, West Sussex, UK, 2004), pp. 63-131.

Yang et al., "Analysis of Intrinsic Stress in Diamond Films by X-ray Diffraction," Advances in X-ray Analysis, vol. 43 (2000), pp. 151-156.

Yashiro et al., "Distribution of unresolvable anisotropic microstructures revealed in visibility-contrast images using x-ray Talbot interferometry", Phys. Rev. B vol. 84 (2011), 094106.

Yashiro et al., "Hard x-ray phase-imaging microscopy using the self-imaging phenomenon of a transmission grating", Phys. Rev. A vol. 82 (2010), 043822.

Yashiro et al., "Theoretical Aspect of X-ray Phase Microscopy with Transmission Gratings" in International Workshop on X-ray and Neutron Phase Imaging with Gratings, AIP Conf. Proc. vol. 1466, (2012), pp. 144-149.

Yashiro et al., "X-ray Phase Imaging and Tomography Using a Fresnel Zone Plate and a Transmission Grating", in "The 10th International Conference on X-ray Microscopy Radiation Instrumentation", AIP Conf. Proc. vol. 1365 (2011) pp. 317-320.

Yashiro et al., "Efficiency of capturing a phase image using cone-beam x-ray Talbot interferometry", J. Opt. Soc. Am. A vol. 25 (2008), pp. 2025-2039.

Yashiro et al., "On the origin of visibility contrast in x-ray Talbot interferometry", Opt. Express (2010), pp. 16890-16901.

Yashiro et al., "Optimal Design of Transmission Grating for X-ray Talbot Interferometer", Advances in X-ray Analysis vol. 49(3) (2006), pp. 375-379.

Yashiro et al., "X-ray Phase Imaging Microscopy using a Fresnel Zone Plate and a Transmission Grating", in the 10th International Conference on Synchrotron Radiation Instrumentation, AIP Conf. Proc. vol. 1234 (2010), pp. 473-476.

Yashiro et. al., "Hard-X-Ray Phase-Difference Microscopy Using a Fresnel Zone Plate and a Transmission Grating", Phys. Rev. Lett. vol. 103 (2009), 180801.

Yu et al., "Morphology and Microstructure of Tungsten Films by Magnetron Sputtering," Mat. Sci. Forum, vol. 913, pp. 416-423 (2018).

Zanette et al., "Two-Dimensional X-Ray Grating interferometer," Phys. Rev. Lett. vol. 105 (2010) pp. 248102-1 248102-4.

Zeeshan et al., "In-house setup for laboratory-based x-ray absorption fine structure spectroscopy measurements," Rev. Sci. Inst. 90, 073105 (2019).

Zeng et al., "Ellipsoidal and parabolic glass capillaries as condensers for x-ray microscopes," Appl. Opt. vol. 47 (May 2008), pp. 2376-2381.

Zeng et al., "Glass Monocapillary X-ray Optics and Their Applications in X-Ray Microscopy," X-ray Optics and Microanalysis: Proceedings of the 20th International Congress, AIP Conf. Proc. vol. 1221, (2010), pp. 41-47.

Zhang et al., "Application of confocal X-ray fluorescence based on capillary X-ray optics in nondestructively measuring the inner diameter of monocapillary optics," Optics Comm. (2018) https://doi.org/10.1016/j.optcom.2018.11.064.

Zhang et al., "Fabrication of Diamond Microstructures by Using Dry and Wet Etching Methods", Plasma Science and Technology vol. 15(6) (Jun. 2013), pp. 552-554.

Zhang et al., "Measurement of the inner diameter of monocapillary with confocal X-ray scattering technology based on capillary X-ray optics," Appl. Opt. (Jan. 8, 2019), doc ID 351489, pp. 1-10.

Behling, "Medical X-ray sources Now and for the Future," Nucl. Inst. and Methods in Physics Research A 873, pp. 43-50 (2017).

Chang et al., "Ultra-high aspect ratio high-resolution nanofabrication of hard X-ray diffractive optics," Nature Comm. 5:4243, doi: 10.1038/ncomms5243 (2014).

Dittler et al., "A mail-in and user facility for X-ray absorption near-edge structure: the CEI-XANES laboratory X-ray spectrometer at University of Washington," J. Synch. Rad. vol. 26, eight pages, (2019).

(56) References Cited

OTHER PUBLICATIONS

Huang et al., "Theoretical analysis and optimization of highly efficient multilayer-coated blazed gratings with high fix-focus constant for the tender X-ray region," Op. Express Vo. 28, No. 2, pp. 821-845 (2020).
Kim et al., "A Simulation Study on the Transfer Characteristics of the Talbot Pattern Through Scintillation Screens in the Grating Interferometer," J. Rad. Sci. and Tech. 42(1), pp. 67-75 (2019).
Kulow et al., "On the Way to Full-Field X-ray Fluorescence Spectroscopy Imaging with Coded Apertures," J. Anal. At. Spectrom. Doi: 10.1039/C9JA00232D (2019).
Li et al., "Production and Heat Properties of an X-ray Reflective Anode Based on a Diamond Heat Buffer Layer," Materials. vol. 13, p. 241 (2020).
Zhou et al., "Quasi-parallel X-ray microbeam obtained using a parabolic monocapillary X-ray lens with an embedded square-shaped lead occluder," arXiv:2001.04667 (2020).
Jin et al., "Development of an X-ray tube with two selective targets modulated by a magnetic field," Rev. Sci. Inst. vol. 90, 083105 (2019).
Li et al., "Study on High Thermal Conductivity of X-ray Anode with Composite Diamond Substrate," J. Phys.: Conf. Ser., vol. 1300, 012115 (2019).
Mijovilovich et al., "Analysis of trace metal distribution in plants with lab-based microscopic X-ray fluorescence imaging," Plant Methods, vol. 16, No. 82, 21 pages (2020).
Pandeshwar et al., "Modeling of beam hardening effects in a dual-phase X-ray grading interferometer for quantitative dark-field imaging," Optics Express, vol. 28, No. 13, Jun. 22, 2020, pp. 19187-19204 (2020).
Penkov et al., "X-Ray Calc: A software for the simulation of X-ray reflectivity," SoftwareX, vol. 12, p. 100528 (2020).
Romano et al., "Microfabrication of X-ray Optics by Metal Assisted Chemical Etching: A Review," Micromachines, vol. 11, No. 589, 23 pages (2020).
Salditt, "Nanoscale Photonic Imaging," Topics in Applied Physics, vol. 134, T. Salditt et al., eds., Springer Open, 2020.
Senba et al., "Stable sub-micrometre high-flux probe for soft X-ray ARPES using a monolithic Wolter mirror," J. Synch. Rad., vol. 27, 5 pages, (2020).
Tucker, "Design of X-Ray Source for Real-Time Computed Tomography," Dissertation, Missouri Univ. of Sci. and Tech., Scholars' Mine, 104 pages (2020).
Zhou et al., "A study of new type electric field modulation multi-target X-ray source," Nucl. Inst. and Methods in Physics Research A, https://doi.org/10.1016/ j.nima.2020.164342 (2020).
Akan et al., "Metal-Assisted Chemical Etching and Electroless Deposition for Fabrication of Hard X-ray Pd/Si Zone Plates," Micromachines, vol. 11, 301; doi: 0.3390/mi11030301 (2020).
Hashimoto et al., "Improved reconstruction method for phase stepping data with stepping errors and dose fluctuations," Optics Express, vol. 28, No. 11, pp. 16363-16384 (2020).
Momose et al., "Recent Progress in X-ray and Neutron Phase Imaging with Gratings," Quantum Beam Science, vol. 4, No. 9; doi:10.3390/qubs4010009 (2020).
Takeo et al., "Soft x-ray nanobeam formed by an ellipsoidal mirror," Appl. Phys. Lett., vol. 116, 121102 (2020).
Wang et al., "Double-spherically bent crystal high-resolution X-ray spectroscopy of spatially extended sources," Chinese Optics Lett., vol. 18(6), 061101 (2020).
Yamada et al., "Compact full-field hard x-ray microscope based on advanced Kirkpatrick-Baez mirrors," Optica, vol. 7, No. 4 pp. 367-370 (2020).
Yoshioka et al., "Imaging evaluation of the cartilage in rheumatoid arthritis patients with an x-ray phase imaging apparatus based on Talbot-Lau interferometry," Scientific Reports, 10:6561, https://doi.org/10.1038/s41598-020-63155-9 (2020).

* cited by examiner

ENERGY-RESOLVING X-RAY DETECTION SYSTEM

CLAIM OF PRIORITY

The present application claims the benefit of priority to U.S. Provisional Appl. No. 62/680,451, filed Jun. 4, 2018 and U.S. Provisional Appl. No. 62/680,795 filed Jun. 5, 2018, each of which is incorporated in its entirety by reference herein.

BACKGROUND

Field

The present application relates generally to systems and methods for energy-resolved x-ray detection.

Description of the Related Art

Many elements have x-ray fluorescence (XRF) lines in the lower energy end of the x-ray spectrum (e.g., having energies in a range below 4 keV and/or wavelengths greater than 0.2 nm, sometimes referred to as "soft" x-rays and/or "tender" x-rays). Detection and energy measurement of such x-rays can be challenging for various reasons, at least some of which include but are not limited to:

- Because x-ray fluorescence yield of characteristic x-rays of energies in the "soft" and "tender" energy range decreases rapidly from about 12% to less than 1%, their detection and measurement suffer from noise background, including Bremsstrahlung radiation and incomplete charge collection in energy detectors.
- Because attenuation and/or scattering of such x-rays in matter increases with decreasing x-ray energy, very thin windows with high x-ray transmission in the propagation path between an object under analysis and an energy dispersive x-ray detector are often used.
- Certain types of x-ray detectors are operated at cooled temperatures (e.g., liquid helium temperatures), and often use a thin high x-ray transmission window attached to the detectors. For x-ray detectors that are sensitive to visible light, the window are made to be opaque to visible light and are frequently coated with a thin metallic layer.
- The absorption of low energy x-rays generally create a small number of detectable signals (e.g., electron-hole pairs in energy-dispersive detectors; superconductor-to-normal conductor transitions due to heat in microcalorimeters), depending on the nature of the detection system. These signals are to be detected with sufficiently high efficiency to provide accurate x-ray energy measurements.
- In many applications, low energy x-rays are to be discriminated from a larger number of higher energy x-rays, which are a major source of background in the low energy x-ray energy spectrum. For example, detection of the higher energy x-rays can give rise to an erroneous lower energy measurement due to incomplete charge collection in the x-ray detector or due to other effects (e.g., Compton scattering; escape of fluorescence x-rays following photoelectric absorption; etc.). In addition these higher energy x-rays can saturate the count rate of the x-ray detector (e.g., for superconductor-based calorimeter x-ray detector).
- For high energy resolution for low energy x-rays, the detector is generally small in size.

Some commercially available low energy x-ray detectors are based on the creation of electron-hole pairs in semiconductor materials (e.g., silicon; germanium), for example, silicon drift detectors, charge-coupled-device (CCD) detector arrays, complementary metal-oxide-semiconductor (CMOS) detector arrays. Other available low energy x-ray detectors utilize electron emission and multiplication from gases, channeltrons, channel plates, avalanche photodiodes, etc., as well as scintillators (e.g., in conjunction with photomultiplier tubes and/or CCD arrays with or without imaging optics). However, most of these commercially available low energy x-ray detectors do not provide energy resolution that is better than ±50 eV. Other commercially available low energy x-ray detectors utilize x-ray microcalorimeters and/or transition-edge x-ray detectors, which can provide energy resolution of 5 eV or better, but that are operated at liquid helium temperatures.

SUMMARY

In one aspect disclosed herein, an energy-resolving x-ray detection system is provided, the system comprising at least one x-ray optic configured to receive x-rays having an energy bandwidth with a maximum x-ray energy. The at least one x-ray optic comprises at least one concave surface extending at least partially around and along a longitudinal axis. The at least one concave surface is curved in at least one cross-sectional plane parallel to the longitudinal axis and is configured to direct at least some of the received x-rays into at least one convergent x-ray beam having a minimum beam width in a plane perpendicular to the longitudinal axis. The minimum beam width is at a location and the at least one concave surface has an x-ray reflectivity less than 30% for x-rays having energies greater than one-third of the maximum x-ray energy. The system further comprises at least one energy-dispersive x-ray detector configured to receive at least a portion of the at least one convergent x-ray beam. The at least one energy-dispersive x-ray detector comprises at least one x-ray absorbing element configured to generate detection signals indicative of energies of x-rays absorbed by the at least one x-ray absorbing element. The at least one x-ray absorbing element is within a range of zero to 40 mm from the location of the minimum beam width.

In another aspect disclosed herein, an energy-resolving x-ray detection system is provided, the system comprising at least one x-ray optic configured to receive x-rays having a first energy bandwidth with a first maximum x-ray energy. The at least one x-ray optic comprises at least one substrate comprising a first material and at least one concave surface extending at least partially around and along a longitudinal axis. The at least one concave surface is curved in at least one cross-sectional plane parallel to the longitudinal axis and is configured to direct at least some of the received x-rays into at least one x-ray beam. The at least one concave surface comprises at least one layer on or over at least a portion of the at least one substrate. The at least one layer comprises a second material having a mass density greater than 3 g/cm$^3$ and a thickness greater than 10 nm, the second material different from the first material. The system further comprises at least one energy-dispersive x-ray detector configured to receive at least a portion of the at least one x-ray beam.

DETAILED DESCRIPTION

Figure 1A:
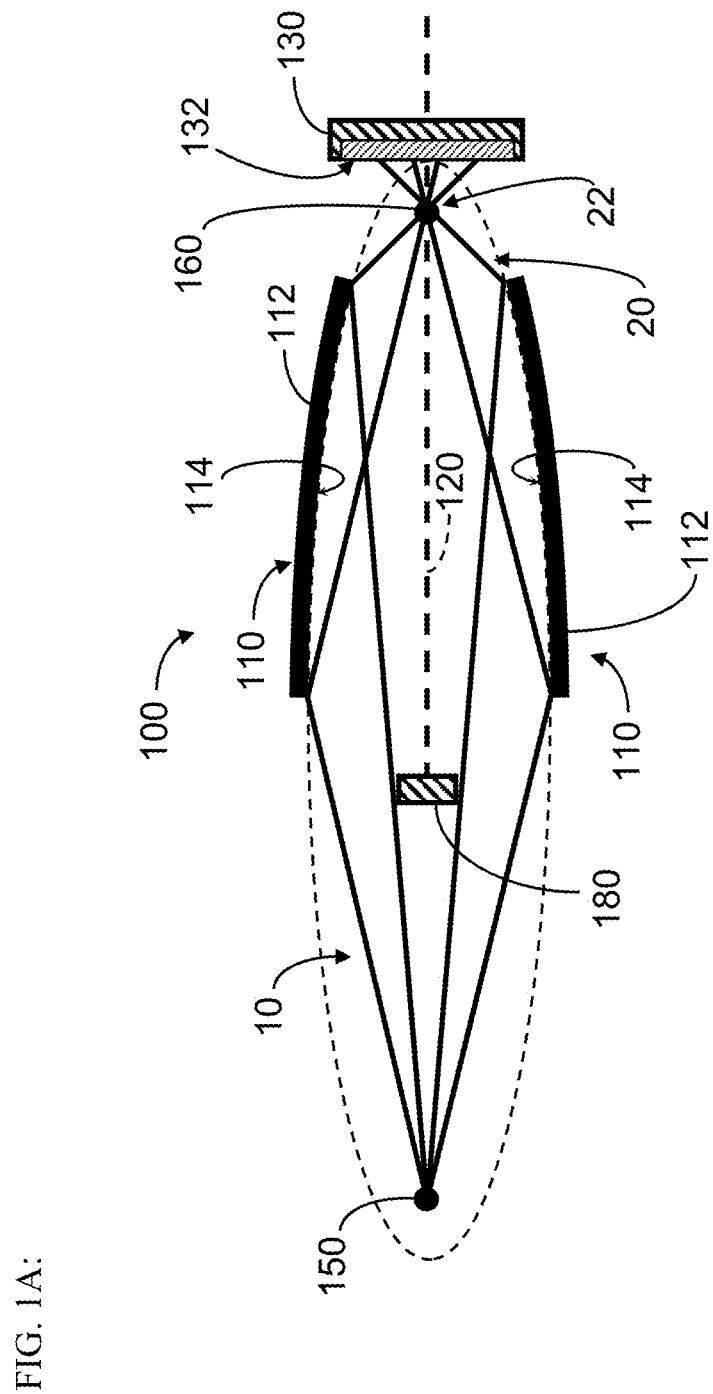
FIGS. 1A and 1B schematically illustrate cross-sectional views of various configurations of an example energy-resolving x-ray detection system in accordance with certain embodiments described herein.
Figure 1B:
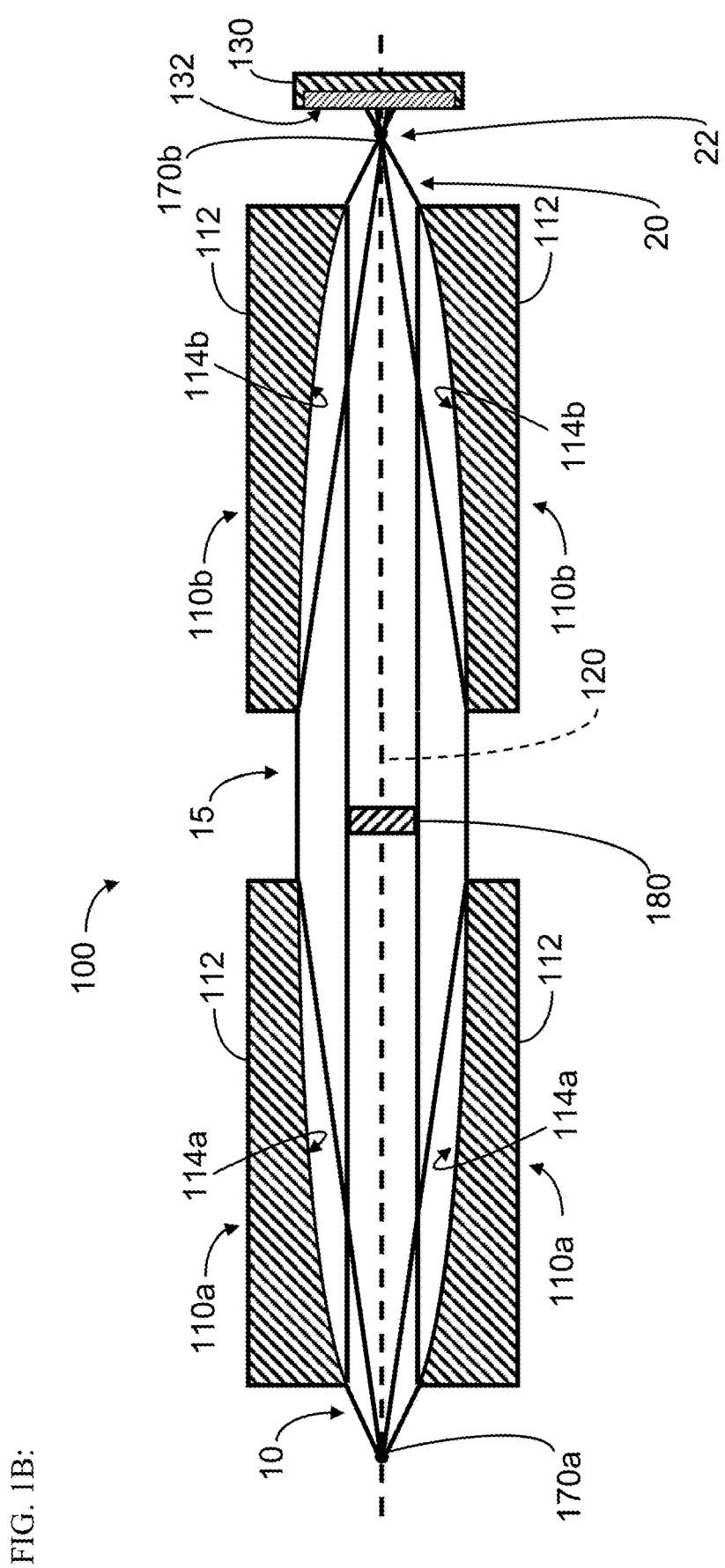

FIGS. 1A and 1B schematically illustrate cross-sectional views of various configurations of an example energy-resolving x-ray detection system 100 in accordance with certain embodiments described herein. As schematically illustrated by FIGS. 1A and 1B, the system 100 comprises at least one x-ray optic 110 configured to receive x-rays 10 having an incident intensity distribution as a function of x-ray energy (e.g., an incident x-ray energy spectrum) with a maximum x-ray energy E. The at least one x-ray optic 110 comprises at least one concave surface 114 extending at least partially around and along a longitudinal axis 120. The at least one concave surface 114 is curved in at least one cross-sectional plane parallel to the longitudinal axis 120 (e.g., in a cross-sectional plane that includes the longitudinal axis 120). The at least one concave surface 114 is configured to direct (e.g., reflect; diffract) at least some of the received x-rays 10 into at least one convergent x-ray beam 20 having a minimum beam width 22 in a plane perpendicular to the longitudinal axis 120, the minimum beam width 22 at a location. The at least one concave surface 114 has an x-ray reflectivity less than 30% for x-rays having energies greater than one-third of the maximum x-ray energy E. The system 100 further comprises at least one energy-dispersive x-ray detector 130 configured to receive at least a portion of the at least one convergent x-ray beam 20. The at least one energy-dispersive x-ray detector 130 comprises at least one x-ray absorbing element 132 configured to generate detection signals indicative of energies of x-rays absorbed by the at least one x-ray absorbing element 132. The at least one x-ray absorbing element 132 is within a range of zero to 40 mm from the location of the minimum beam width 22. The cross-sectional views of FIGS. 1A and 1B are in a cross-sectional plane that is parallel to the longitudinal axis 120 (e.g., the cross-sectional plane includes the longitudinal axis 120).

In certain embodiments, a distance of the at least one concave surface 114 from the longitudinal axis 120 varies as a function of position along the longitudinal axis 120. For example, the concave surface 114 can comprise an inner surface of a hollow axially symmetric structure (e.g., an axially symmetric tube) having an inner diameter which varies as a function of position along the longitudinal axis 120. In certain such embodiments, at least a portion of the structure can be tapered (e.g., having a first inner diameter at a first position along the longitudinal axis 120 and having a second inner diameter at a second position along the longitudinal axis 120, the second inner diameter smaller than the first inner diameter; a portion of a tapered cone profile). At least a portion of the concave surface 114 of certain embodiments can have a distance from the longitudinal axis 120 that does not vary as a function of position along the longitudinal axis 120. For example, the portion of the concave surface 114 can comprise an inner surface of a structure having an inner diameter that does not substantially vary (e.g., does not vary by more than 10%) as a function of position along the longitudinal axis 120.

In certain embodiments, at least a portion of the concave surface 114 has a profile that comprises a portion of a quadric profile in a cross-sectional plane that comprises the longitudinal axis 120. In certain embodiments, the at least one concave surface 114 comprises multiple portions having cross-sectional profiles (e.g., in a cross-sectional plane that comprises the longitudinal axis 120) comprising corresponding quadric profiles. Examples of quadric profiles compatible with certain embodiments described herein include, but are not limited to: at least one ellipsoid; at least one paraboloid; at least one hyperboloid; or a combination of two or more thereof.

In certain embodiments, the at least one x-ray optic 110 comprises at least one substrate 112 (e.g., comprising glass or silicon oxide) comprises a single, unitary element. For example, the substrate 112 can comprise a hollow axially symmetric structure (e.g., a tube) extending along the longitudinal axis 120 and the at least one concave surface 114 comprises an inner surface of the structure that extends fully around the longitudinal axis 120 (e.g., encircles the longitudinal axis 120; extends 360 degrees around the longitudinal axis 120). In certain other embodiments, the at least one substrate 112 comprises at least one portion of a hollow axially symmetric structure (e.g., a portion of an axially symmetric tube) extending along the longitudinal axis 120 with an inner surface that extends only partially around the longitudinal axis 120 (e.g., less than 360 degrees; in a range of 45 degrees to 315 degrees; in a range of 45 degrees to 360 degrees; in a range of 180 degrees to 360 degrees; in a range of 90 degrees to 270 degrees). In certain embodiments, the at least one substrate 112 comprises multiple substrate portions (e.g., 2, 3, 4, 5, 6, or more) separate from one another (e.g., with spaces between the substrate portions) and distributed around the longitudinal axis 120, with the concave surface 114 of each substrate portion extending at least partially around and along the longitudinal axis 120. For example, the concave surfaces 114 of the multiple substrate portions can each extend around the longitudinal axis 120 by an angle in a range of 15 degrees to 175 degrees, in a range of 30 degrees to 115 degrees, and/or in a range of 45 degrees to 85 degrees.

In certain embodiments, the at least one concave surface 114 has a first linear dimension (e.g., length) parallel to the longitudinal axis 120 in a range of 3 mm to 150 mm, a second linear dimension (e.g., width) perpendicular to the first linear dimension in a range of 1 mm to 50 mm, and a maximum linear dimension (e.g., an inner diameter; a maximum length of a straight line segment joining two points on the concave surface 114) in a range of 1 mm to 50 mm in a plane perpendicular to the longitudinal axis 120, a surface roughness in a range of 0.1 nm to 1 nm, and/or a plurality of surface tangent planes having a range of angles relative to the longitudinal axis 120 in a range of 0.01 radian to 0.5 radian (e.g., in a range of 0.01 radian to 0.4 radian; in a range of 0.01 radian to 0.3 radian; in a range of 0.01 radian to 0.2 radian).

For example, FIG. 1A schematically illustrates a cross-sectional view of an example system 100 in which the at least one concave surface 114 has a portion of an ellipsoidal profile in a cross-sectional plane comprising the longitudinal axis 120 in accordance with certain embodiments described herein. An x-ray source (e.g., a sample emitting fluorescence x-rays; a point source; a diverging x-ray source) emits x-rays 10 that have a range of x-ray energies and have an isotropic spatial distribution. As schematically illustrated by FIG. 1A, the x-ray source is positioned at or near a first focus 150 of the ellipsoidal profile such that at least some of the emitted x-rays 10 are received by the at least one concave surface 114. At least some of the received x-rays 10 impinge the at least one concave surface 114 at an incident grazing angle that is smaller than the critical angle, and are reflected into the at least one convergent x-ray beam 20. The at least one convergent x-ray beam 20 from the at least one concave surface 114 is directed towards a second focus 160 of the ellipsoidal profile (e.g., the location of the minimum beam width 22) and is received by the at least one energy-dispersive x-ray detector 130 positioned away from the second focus 160 (e.g., positioned such that the second focus 160 is between the at least one x-ray optic 110 and the at least one energy-dispersive x-ray detector 130 and the at least one convergent x-ray beam 20 diverges from the second focus 160 before being received by the at least one energy-dispersive x-ray detector 130).

For another example, FIG. 1B schematically illustrates a cross-sectional view of an example system 100 in which the at least one x-ray optic 110 comprises two portions 110a, 110b and the at least one concave surface 114 comprises first and second portions 114a, 114b, each with a paraboloidal profile in a cross-sectional plane comprising the longitudinal axis 120 in accordance with certain embodiments described herein. The x-ray source (e.g., a sample emitting fluorescence x-rays; a point source; a diverging x-ray source) emits x-rays 10 that have a range of x-ray energies and have an isotropic spatial distribution. As schematically illustrated by FIG. 1B, the x-ray source is positioned at or near a focus 170a of the first paraboloidal profile (e.g., a paraboloidal collimator), and at least some of the x-rays 10 from the x-ray source are received by the first portion 114a. At least some of the received x-rays 10 impinge the first portion 114a at an incident grazing angle that is smaller than the critical angle, and are reflected and collimated by the first portion 114a (e.g., in a direction parallel to the longitudinal axis 120). The collimated x-rays 15 are received by the second portion 114b, which has a second paraboloidal profile (e.g., a focusing paraboloidal mirror), and at least some of the collimated x-rays 15 received by the second portion 114b impinge the second portion 114b at an incident grazing angle that is smaller than the critical angle, and are reflected and focused (e.g., re-focused) into the at least one convergent x-ray beam 20 which propagates towards a focus 170b of the second portion 114b and is received by the at least one energy-dispersive x-ray detector 130 positioned away from the focus 170b (e.g., positioned such that the focus 170b is between the second portion 110b of the at least one x-ray optic 110 and the at least one energy-dispersive x-ray detector 130 and the at least one convergent x-ray beam 20 diverges from the focus 170b before being received by the at least one energy-dispersive x-ray detector 130).

Figure 2A:
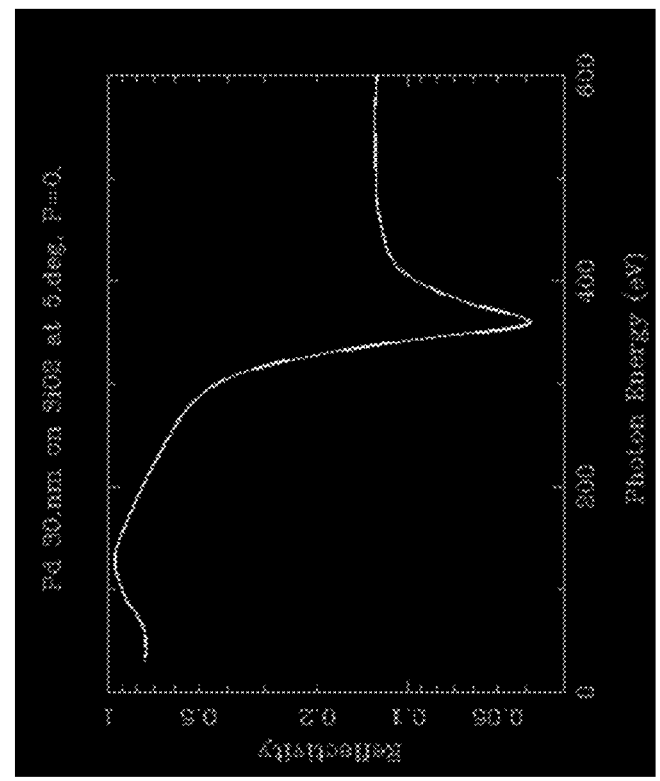
FIG. 2A shows the reflectivity of a platinum layer deposited on a $SiO_2$ structure and that has a thickness of 30 nm in accordance with certain embodiments described herein.
Figure 2B:
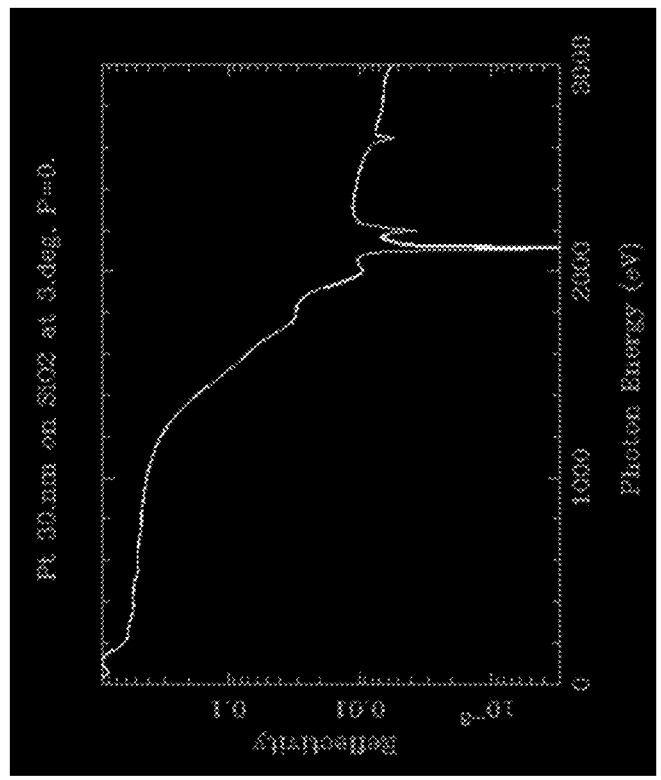
FIG. 2B shows the reflectivity of a palladium layer deposited on a $SiO_2$ structure and that has a thickness of 30 nm in accordance with certain embodiments described herein.

In certain embodiments, the system 100 further comprises at least one layer on or over a portion of the at least one concave surface 114, such that the at least one concave surface 114 has an x-ray reflectivity that varies as a function of incident x-ray energy. For example, the at least one x-ray optic 110 can comprise at least one substrate 112, and the at least one concave surface 114 can comprise at least one surface of the at least one substrate 112 and the at least one layer can be on or over at least a portion of the at least one surface of the at least one substrate 112. The substrate 112 can comprise a first material (e.g., glass; silicon oxide) and the at least one layer can comprise a second material different from the first material (e.g., having a mass density greater than 3 g/cm$^3$ and a thickness greater than 10 nm). For example, FIG. 2A shows the reflectivity of a platinum layer deposited on a $SiO_2$ structure and that has a thickness of 30 nm in accordance with certain embodiments described herein, and FIG. 2B shows the reflectivity of a palladium layer deposited on a $SiO_2$ structure and that has a thickness of 30 nm in accordance with certain embodiments described herein.

In certain embodiments, the at least one layer can comprise a mosaic crystal structure and/or a plurality of layers (e.g., a multilayer stack; a stack of layers that have been sequentially deposited onto the concave surface 114 and one another, the layers having selected materials and selected thicknesses). The mosaic crystal structure can comprise one or more mosaic graphite crystal structures, including but not limited to, highly oriented pyrolytic graphite (HOPG), highly annealed pyrolytic graphite (HAPG), or a combination thereof, and the at least one mosaic crystal structure can have a thickness in a range of 5 microns to 100 microns (e.g., 10 microns to 100 microns) and a mosaicity (e.g., mosaic spread) in a range of 0.05 degree to 1 degree (e.g., 0.1 degree to 1 degree). The plurality of layers can comprise a first plurality of first layers comprising a first material and a second plurality of second layers comprising a second material, the first layers and the second layers alternating with one another in a direction perpendicular to the concave surface 114. For example, the at first material and the second material of the plurality of alternating layers can have a mass density difference of more than 1 g/cm$^3$ between neighboring layers of the plurality of alternating layers and each of the alternating layers can have a thickness in a range of 1 nm to 9 nm. In certain embodiments, the plurality of layers are formed by at least one of: atomic layer deposition (ALD), chemical-vapor deposition (CVD), sputtering, or a combination of two or more thereof. In certain embodiments, the plurality of layers modifies the critical angle, thereby increasing the solid angle acceptance of the at least one x-ray optic 110. The at least one mosaic crystal structure and/or the plurality of layers can be configured to direct (e.g., diffract) at least some of the x-rays 10 received by the at least one x-ray optic 110 towards the at least one energy-dispersive x-ray detector 130. Examples of a mosaic crystal structure and a plurality of layers compatible with certain embodiments described herein are disclosed in U.S. Provisional Appl. No. 62/680,451, filed Jun. 4, 2018 and U.S. Provisional Appl. No. 62/680,795 filed Jun. 5, 2018, each of which is incorporated in its entirety by reference herein, and in the U.S. non-provisional application entitled "Wavelength Dispersive X-Ray Spectrometer" filed on even date herewith and incorporated in its entirety by reference herein.

Figure 3:
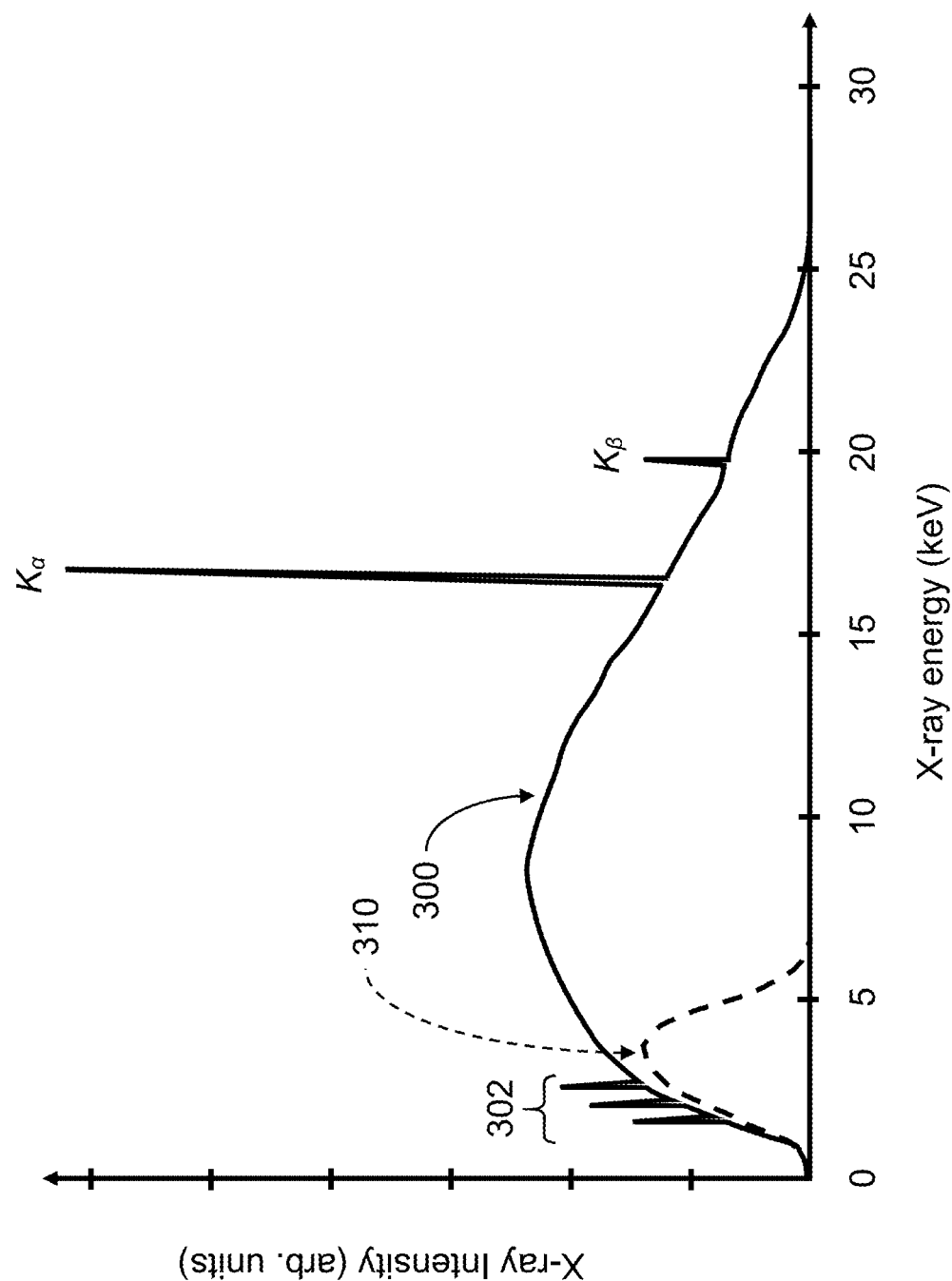
FIG. 3 schematically illustrates an example x-ray spectrum of the received x-rays incident to the at least one concave surface and an example x-ray spectrum for the x-rays from the at least one concave surface in accordance with certain embodiments described herein.

FIG. 3 schematically illustrates an example x-ray spectrum 300 (solid line) of the received x-rays 10 incident to the at least one concave surface 114 in accordance with certain embodiments described herein. FIG. 3 also schematically illustrates an example x-ray spectrum 310 (dashed line) for the x-rays 20 from the at least one concave surface 114. The incident x-ray spectrum 300 has a first intensity distribution as a function of x-ray energy and a first energy bandwidth with a first maximum x-ray energy, and the x-ray spectrum 310 has a corresponding second intensity distribution as a function of x-ray energy that is different from the first intensity distribution and a second maximum x-ray energy that is lower than the first maximum x-ray energy. For example, as shown schematically in FIG. 3, the example incident x-ray spectrum 300 of the incident received x-rays 10 (e.g., corresponding to the emitted x-rays from an electron-bombarded x-ray target) has substantial intensity values across a broad range of x-ray energies (e.g., a first energy bandwidth in a range of 0.5 keV to 25 keV), as well as characteristic $K_\alpha$ and $K_\beta$ emission lines and other x-ray fluorescence (XRF) lines 302 that are to be detected in the low energy region (e.g., below 5 keV). The x-ray spectrum 310 of the at least one convergent x-ray beam 20 has substantial intensity values in a narrower range of x-ray energies (e.g., a second energy bandwidth in a range of 0.5 keV to 8 keV) with lower intensity values than those of the incident x-ray spectrum 300 at the same x-ray energies. Although not shown in FIG. 3, the x-ray spectrum 310 also includes the XRF lines 302 that are to be detected, the lines 302 having only a small reduction in intensity values in the x-ray spectrum 310. In this way, certain embodiments described herein advantageously provide x-ray spectra having a reduction of x-rays at higher energies (e.g., a narrower energy bandwidth), while leaving XRF lines 302 of interest in the low energy region relatively unaffected, which can lead to numerous advantages when used in conjunction with an energy-dispersive x-ray detector 130.

In certain embodiments, at least one concave surface 114 has an x-ray reflectivity that is less than 30% for x-rays having energies greater than a predetermined x-ray energy (e.g., 5 keV; 7 keV; 9 keV; one-third of the maximum x-ray energy of the incident x-ray spectrum 300). As used herein, the maximum x-ray energy of the incident x-ray spectrum is the x-ray energy above which the incident x-ray spectrum is equal to zero. For example, for an x-ray tube in which the x-rays are generated by an electron beam bombarding a target material, the maximum x-ray energy of the generated x-rays is equal to the kinetic energy of the electron beam. The x-ray emission spectrum from a sample being irradiated by x-rays from such an x-ray source also has a maximum x-ray energy equal to the kinetic energy of the electron beam. For example, as schematically illustrated in FIG. 3, the maximum x-ray energy of the incident x-ray spectrum 300 is approximately 25 keV, and the x-ray reflectivity of the at least one concave surface 114 is less than 30% for x-rays having energies greater than about 8.3 keV. In certain such embodiments, the x-ray spectrum 310 has a high-energy cut-off (e.g., at an x-ray energy less than one-third of the maximum x-ray energy of the incident x-ray spectrum 300).

In certain embodiments, the system 100 further comprises at least one beam stop 180 configured to be placed in the x-ray beam path to stop (e.g., intercept; prevent) x-rays that are propagating along the longitudinal axis 120 but that do not irradiate the at least one x-ray optic 110 from reaching the at least one energy-dispersive x-ray detector 130. The at least one beam stop 180 of certain embodiments defines a cone angle (e.g., less than 3 degrees; less than 50 mrad) centered around the longitudinal axis 120. The at least one beam stop 180 can be positioned at the entrance side of the at least one x-ray optic 110 (see, e.g., FIG. 1A), between two portions 110a, 110b of the at least one x-ray optic 110 (see, e.g., FIG. 1B), and/or at the exit side of the at least one x-ray optic 110. For example, the at least one beam stop 180 can be held in place by thin radial wires mechanically coupled to a supporting structure or by a thin membrane.

Figure 4:
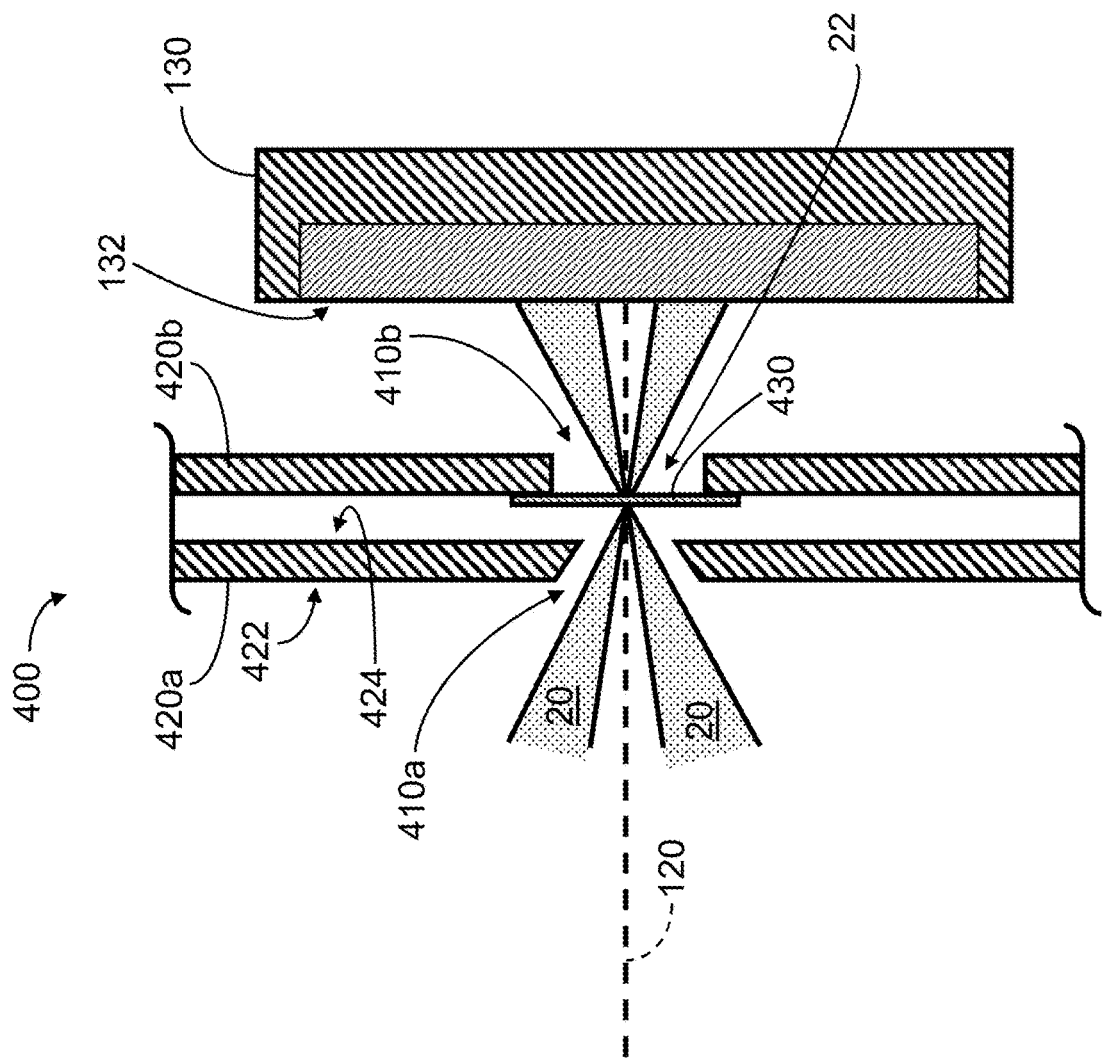
FIG. 4 schematically illustrates a cross-sectional view of an example at least one x-ray transmissive aperture in accordance with certain embodiments described herein.

In certain embodiments, the system 100 further comprises at least one x-ray transmissive aperture 400 between the at least one concave surface 114 and the at least one energy-dispersive x-ray detector 130, and FIG. 4 schematically illustrates an example x-ray transmissive aperture 400 in accordance with certain embodiments described herein. The at least one x-ray transmissive aperture 400 of certain embodiments comprises at least one orifice 410 (e.g., hole) that extends from a first side 422 of at least one structure 420 (e.g., plate) to a second side 424 of the at least one structure 420, the at least one structure 420 comprising at least one first material that is opaque to the at least one convergent x-ray beam 20. The at least one orifice 410 is transmissive of at least a portion of the at least one convergent x-ray beam 20. For example, the at least one orifice 410 can be substantially empty of material (e.g., a hole substantially devoid of material or at vacuum) or the at least one orifice 410 can comprise at least one second material that is substantially transmissive of at least a portion of the at least one convergent x-ray beam 20.

In certain embodiments, the at least one x-ray transmissive aperture 400 comprises at least one window 430 configured to be transmissive to at least a portion of the at least one convergent x-ray beam 20. For example, the at least one window 430 can be within the at least one orifice 410 of the at least one structure 420 and/or can be outside the at least one orifice 410 (e.g., mounted on a surface of the at least one structure 420). The at least one window 430 can have a thickness in a range of 20 nm to 2 microns and can comprise at least one of: diamond, silicon nitride, silicon carbide, and polymer. In certain embodiments, the at least one window 430 comprises at least one metallic layer having a thickness in a range of 30 nm to 200 nm and comprising at least one of: Al, Sc, Ti, V, Cr, Ni, Co, Cu, Zr, Mo, Ru, Rh, Pd, Ag, La, and alloys and/or combinations thereof.

As schematically illustrated by FIG. 4, the example at least one x-ray transmissive aperture 400 comprises a first structure 420a having a first orifice 410a, a second structure 420b comprising a second orifice 410b, and a window 430 over the second orifice 410b. At least a portion of the at least one convergent x-ray beam 20 propagates through the window 430 and is received by the at least one x-ray absorbing element 132 of the at least one energy-dispersive x-ray detector 130.

In certain embodiments, at least a portion of the at least one x-ray transmissive aperture 400 is positioned within a range of zero to 40 mm from the location of the minimum beam width 22. For example, the at least one x-ray transmissive aperture 400 can be at or near (e.g., within 40 mm; within 20 mm; within 10 mm) the second focus 160 of the example system 100 schematically illustrated in FIG. 1A or at or near (e.g., within 40 mm; within 20 mm; within 10 mm) the focus 170b of the second portion 110b of the at least one x-ray optic 110 of the example system 100 schematically illustrated in FIG. 1B. As schematically illustrated by FIG. 4, the window 430 of the at least one x-ray transmissive aperture 400 is positioned at or near (e.g., within 20 mm; within 10 mm) the location of the minimum beam width 22. The at least one orifice 410 of the x-ray transmissive aperture 400 can have a dimension (e.g., width in a plane perpendicular to the longitudinal axis 120) that is greater than the minimum beam width 22 (e.g., between 105% and 300% of the beam size of the at least one convergent x-ray beam 20 at the position of the at least one x-ray transmissive aperture 400). For example, the minimum beam width 22 can be less than or equal to 2 mm, and the at least one orifice 410 can have a width in a plane perpendicular to the longitudinal axis 120 that is: less than 2.1 mm; between 2.1 mm and 6 mm; less than 6 mm. In certain embodiments, the at least one x-ray transmissive aperture 400 is rigidly mechanically coupled to the at least one energy-dispersive x-ray detector 130. In certain embodiments, the at least one window 430 is a component of the at least one energy-dispersive x-ray detector 130.

In certain embodiments the at least one energy-dispersive x-ray detector 130 has an energy resolution in a range of 0.5 eV to 130 eV. In certain embodiments, the at least one energy-dispersive x-ray detector 130 is selected from the group consisting of: a silicon drift x-ray detector (SDD), a superconductor-based x-ray microcalorimeter detector (e.g., comprising a plurality of active elements), a lithium drift Si x-ray detector, a lithium drift Ge x-ray detector, a p-i-n diode x-ray detector (e.g., with an active area with a length or width less than 1 mm), and a transition-edge x-ray detector (e.g., comprising a plurality of active elements). For example, the at least one x-ray absorbing element 132 can comprise a material (e.g., silicon; germanium; superconducting material) and corresponding electronics configured to detect an amount of ionization, electron/hole pair formation, and/or heat produced within the material by an incoming x-ray. In certain embodiments, the at least one energy-dispersive x-ray detector 130 comprises a single x-ray absorbing element 132, while in certain other embodiments, the at least one energy-dispersive x-ray detector 130 comprises a plurality of x-ray absorbing elements 132 arranged is a spatial array.

In certain embodiments, the at least one energy-dispersive x-ray detector 130 comprises a pixel array x-ray detector configured to record a spatial distribution of at least a portion of the x-rays 20 received from the at least one x-ray optic 110. Each pixel of the pixel array can be configured to generate detection signals indicative of the energies of x-rays absorbed by the pixel. For example, as disclosed in U.S. Provisional Appl. No. 62/680,451, filed Jun. 4, 2018 and U.S. Provisional Appl. No. 62/680,795 filed Jun. 5, 2018, each of which is incorporated in its entirety by reference herein, and in U.S. non-provisional application entitled "Wavelength Dispersive X-Ray Spectrometer" filed on even date herewith and incorporated in its entirety by reference herein, the x-rays 20 from the at least one x-ray optic 110 diverge from one another at the location of the minimum beam width 22 such that x-rays 20 with different x-ray energies are spatially distinct from one another due to the Bragg relation, and the x-rays 20 with a range of x-ray energies impinge the x-ray detector 130 across a corresponding range of positions. A spatially-resolving x-ray detector 130 of certain embodiments detects the x-rays 20 with a spatial resolution that can be related to an energy resolution.

In certain embodiments, the pixel array x-ray detector can be one-dimensional (e.g., extending along one dimension; extending along one direction perpendicular to the longitudinal axis 120) or can be two-dimensional (e.g., extending along two orthogonal dimensions; extending along two directions that are perpendicular to one another and to the longitudinal axis 120), with pixel sizes in a range from 1 micron to 200 microns (e.g., in a range of 2 microns to 200 microns; in a range of 3 microns to 200 microns). Example pixel array x-ray detectors 130 compatible with certain embodiments described herein include but are not limited to: direct-detection charge-coupled-device (CCD) detector, complementary metal-oxide-semiconductor (CMOS) detector, energy-resolving x-ray detector, indirect conversion detector comprising an x-ray scintillator, a photon counting detector.

In certain embodiments, the combination of the at least one x-ray optic 110 and the at least one energy-dispersive x-ray detector 130 provides advantages in the detection of soft and tender x-rays as compared to the at least one energy-dispersive x-ray detector 130 alone. For example, by using the at least one x-ray optic 110 to reduce the amount of higher energy x-rays (e.g., x-rays with energies above 10 keV) that impinge the at least one energy-dispersive x-ray detector 130, certain embodiments advantageously improve the signal-to-noise ratio by reducing the background contribution from these higher energy x-rays in the detected x-ray spectrum (e.g., due to incomplete charge collection in silicon drift detector elements), thereby making it easier to identify small peaks in the detected x-ray spectrum (e.g., XRF lines 302 with energies less than or equal to 5 keV, as schematically illustrated in FIG. 3). For another example, the combination of the at least one x-ray optic 110 and the at least one energy-dispersive x-ray detector 130 provides improved energy resolution as compared to the at least one energy-dispersive x-ray detector 130 alone. In certain such embodiments, the combination of the at least one x-ray optic 110 and the at least one energy-dispersive x-ray detector 130 provides sufficient energy resolution (e.g., in a range of 10 eV to 20 eV) to distinguish soft x-ray emission lines (e.g., having full-widths-at-half-maximum in a range of 1 eV to 8 eV and separated from one another by an energy in a range of 10 eV to 20 eV) from one another. For example, a silicon drift detector (SDD) element can take high counting rates (e.g., up to 1 MHz), but the SSD element suffers from incomplete charge collection issues and the energy resolution of the SDD element is about 130 eV (or about 50 eV for x-rays with low energies). By utilizing the energy resolution provided by the spatial discrimination of an x-ray detector 130 comprising an array of SDD elements (e.g., the energy resolution resulting from the x-rays 20 with different x-ray energies impinging different SDD elements across a corresponding range of positions), certain embodiments are able to provide improved energy resolution as compared to the energy resolution of the individual SDD elements.

In certain embodiments, the combination of the at least one x-ray optic 110 and the at least one energy-dispersive x-ray detector 130 provides improved use of limited count rates as compared to the at least one energy-dispersive x-ray detector 130 alone. For example, CCD and CMOS detectors can provide energy resolutions down to about 50 eV, are only able to receive a single x-ray photon per read-out time, and typically use a thin window to prevent background contribution from visible light. Also, superconductor-based x-ray microcalorimeter detectors have high energy resolution (e.g., in a range of 1 eV to 2 eV), but are only able to take relatively low counting rates (e.g., less than 1 KHz/pixel). By reducing the amount of higher energy x-rays (e.g., x-rays with energies above 10 keV) that impinge the at least one energy-dispersive x-ray detector 130, certain embodiments advantageously reduce the fraction of the total number of counts that are due to the x-rays that are not of interest (e.g., higher energy x-rays), so a higher fraction of the limited count rate of such detector is devoted to detection of the soft and tender x-rays of interest (e.g., with energies below 5 keV).

In certain embodiments, the system 100 further comprises a means for calibrating the x-ray energy for each pixel of the pixel array (e.g., using the known x-ray spectrum of the x-rays emitted by the x-ray source). For example, the system 100 can be configured to receive the x-rays 10 emitted from an x-ray source having a known x-ray spectrum and to direct at least some of the received x-rays towards the at least one x-ray detector 130.

In certain embodiments, the system 100 is configured to have x-rays 20 in the 0.1 keV to 4 keV range impinge the at least one energy-dispersive x-ray detector 130, while in certain other embodiments, the range extends as high as 14 keV. Such x-ray energy ranges can be achieved using at least one coating on the at least one concave surface 114, the at least one coating comprising one or more layers having a mass density greater than 3 g/cm$^3$, and the materials, thicknesses, and other parameters of the at least one coating in accordance with certain embodiments described herein are clear in view of the information provided herein. In certain embodiments, the system 100 is a component of an x-ray analysis system comprising an excitation source of radiation and/or particles (e.g., an x-ray source configured to emit x-rays; an electron source configured to emit electrons; a laboratory excitation source) that illuminate a sample (e.g., object being analyzed). In certain embodiments, the excitation source comprises an optical system (e.g., additional x-ray optics; electron optics) placed between the excitation source and the sample to direct and/or focus the radiation and/or particles onto the sample. The sample is configured to emit x-rays (e.g., fluorescence x-rays) in response to the excitation, and the emitted x-rays are received, detected, and analyzed by the system 100.

In certain embodiments, the system 100 (e.g., as schematically illustrated in FIGS. 1A and FIG. 1B) is configured to collect x-rays with a larger solid angle than is possible with an energy-resolving x-ray detector 130 alone. Certain embodiments described herein advantageously reduce the number of x-rays having energies greater than a predetermined x-ray energy arriving at the at least one energy-dispersive x-ray detector 130 (see, e.g., FIG. 3), thereby (i) reducing the background for fluorescence x-rays of energies lower than the predetermined x-ray energy due to incomplete charge collection of the higher energy x-rays, and (ii) avoiding detection saturation. Certain embodiments described herein advantageously allow the at least one energy-dispersive x-ray detector 130 to be used with a window 430 (e.g., a window 430 having a pressure differential with vacuum on one side and atmospheric pressure on the other side) that has a small area and thickness while achieving high x-ray transmission and low visible light transmission with sufficient mechanical strength (e.g., to withstand the pressure differential). Certain embodiments described herein advantageously allow the use of energy-dispersive x-ray detectors 130 (e.g., silicon drift energy-dispersive x-ray detectors) with a small detector area to achieve high energy resolution. Certain embodiments described herein advantageously allow the use of a superconductor-based colorimeter with a small area to achieve higher energy resolution and time response.

It is to be appreciated that the embodiments disclosed herein are not mutually exclusive and may be combined with one another in various arrangements.

The invention described and claimed herein is not to be limited in scope by the specific example embodiments herein disclosed, since these embodiments are intended as illustrations, and not limitations, of several aspects of the invention. Any equivalent embodiments are intended to be within the scope of this invention. Indeed, various modifications of the invention in form and detail, in addition to those shown and described herein, will become apparent to those skilled in the art from the foregoing description. The breadth and scope of the invention should not be limited by any of the example embodiments disclosed herein.

What is claimed is:

1. An energy-resolving x-ray detection system comprising:

at least one x-ray optic configured to receive x-rays having an energy bandwidth with a maximum x-ray energy, the at least one x-ray optic comprising at least one concave surface extending at least partially around and along a longitudinal axis, the at least one concave surface curved in at least one cross-sectional plane parallel to the longitudinal axis and configured to direct at least some of the received x-rays into at least one convergent x-ray beam having a minimum beam width in a plane perpendicular to the longitudinal axis, the minimum beam width at a location, the at least one concave surface having an x-ray reflectivity less than 30% for x-rays having energies greater than one-third of the maximum x-ray energy; and at least one energy-dispersive x-ray detector configured to receive at least a portion of the at least one convergent x-ray beam, the at least one energy-dispersive x-ray detector comprising at least one x-ray absorbing element configured to generate detection signals indicative of energies of x-rays absorbed by the at least one x-ray absorbing element, the at least one x-ray absorbing element within a range of zero to 40 mm from the location of the minimum beam width.

2. The system of claim 1, further comprising at least one x-ray transmissive aperture between the at least one x-ray optic and the at least one energy-dispersive x-ray detector.

3. The system of claim 2, wherein the at least one x-ray transmissive aperture has a width in the plane perpendicular to the longitudinal axis that is greater than the minimum beam width.

4. The system of claim 2, wherein the at least one x-ray transmissive aperture is within a range of zero to 40 mm from the location of the minimum beam width.

5. The system of claim 2, wherein the at least one x-ray transmissive aperture is rigidly mechanically coupled to the at least one energy-dispersive x-ray detector.

6. The system of claim 2, wherein the at least one x-ray transmissive aperture comprises at least one window having a thickness in a range of 20 nm to 2 microns and comprising at least one of: diamond, silicon nitride, silicon carbide, and polymer.

7. The system of claim 6, wherein the at least one window comprises at least one metallic layer having a thickness in a range of 30 nm to 200 nm and comprising at least one of: Al, Sc, Ti, V, Cr, Ni, Co, Cu, Zr, Mo, Ru, Rh, Pd, Ag, La, and alloys and/or combinations thereof.

8. The system of claim 1, wherein the at least one concave surface has a length parallel to the longitudinal axis in a range of 3 mm to 150 mm, a width perpendicular to the length in a range of 1 mm to 50 mm, an inner diameter in a range of 1 mm to 50 mm in a plane perpendicular to the longitudinal axis, a surface roughness in a range of 0.1 nm to 1 nm, and/or a plurality of surface tangent planes having a range of angles relative to the longitudinal axis in a range of 0.01 radian to 0.2 radian.

9. The system of claim 1, wherein the at least one x-ray optic comprises at least one substrate and the at least one concave surface comprises at least one surface of the at least one substrate and at least one layer on or over at least a portion of the at least one surface of the at least one substrate.

10. The system of claim 9, wherein the at least one substrate comprises glass.

11. The system of claim 10, wherein the at least one layer comprises a material having a mass density greater than 3 g/cm$^3$ and a thickness greater than 10 nm.

12. The system of claim 9, wherein the at least one layer comprises a plurality of alternating layers having a mass density difference of more than 1 g/cm$^3$ between neighboring layers of the plurality of alternating layers.

13. The system of claim 12, wherein each of the alternating layers has a thickness in a range of 1 nm to 9 nm.

14. The system of claim 9, wherein the at least one substrate comprises a hollow axially symmetric structure and the at least one concave surface comprises an inner surface of the structure, the inner surface encircling the longitudinal axis and axially symmetric about the longitudinal axis.

15. The system of claim 1, wherein the at least one concave surface of the at least one x-ray optic extends around the longitudinal axis by an angle in a range of 45 degrees to 315 degrees.

16. The system of claim 1, wherein at least a portion of the at least one concave surface has a profile in a cross-sectional plane that comprises the longitudinal axis, the profile selected from the group consisting of: at least one ellipsoid; at least one paraboloid; at least one hyperboloid; a tapered cone; and a combination of two or more thereof.

17. The system of claim 1, wherein the minimum beam width is less than or equal to 2 mm.

18. The system of claim 1, wherein the at least one energy-dispersive x-ray detector is selected from the group consisting of: p-i-n diode x-ray detector; silicon drift x-ray detector; x-ray microcalorimeter detector; transition-edge x-ray detector.

19. The system of claim 1, further comprising at least one beam stop configured to stop x-rays that are propagating along the longitudinal axis but that do not irradiate the at least one concave surface from reaching the at least one energy-dispersive x-ray detector.

20. The system of claim 1, wherein the at least one energy-dispersive x-ray detector comprises at least one pixel array x-ray detector.

21. The system of claim 20, wherein the at least one pixel array x-ray detector comprises is selected from the group consisting of: direct-detection charge-coupled-device (CCD) detector; complementary metal-oxide-semiconductor (CMOS) detector; energy-resolving x-ray detector; indirect conversion detector comprising an x-ray scintillator; photon counting detector.

* * * * *